US011677509B2

(12) United States Patent
Shrestha et al.

(10) Patent No.: US 11,677,509 B2
(45) Date of Patent: Jun. 13, 2023

(54) ACKNOWLEDGMENT FEEDBACK TECHNIQUES IN WIRELESS COMMUNICATIONS WITH LARGE PROPAGATION DELAYS

(71) Applicant: QUALCOMM Incorporated, San Diego, CA (US)

(72) Inventors: Bharat Shrestha, San Diego, CA (US); Xiao Feng Wang, San Diego, CA (US); Umesh Phuyal, San Diego, CA (US); Alberto Rico Alvarino, San Diego, CA (US); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 17/178,083

(22) Filed: Feb. 17, 2021

(65) Prior Publication Data

US 2021/0266109 A1 Aug. 26, 2021

Related U.S. Application Data

(60) Provisional application No. 62/980,098, filed on Feb. 21, 2020.

(51) Int. Cl.
H04W 76/27 (2018.01)
H04L 5/00 (2006.01)
(Continued)

(52) U.S. Cl.
CPC .......... H04L 1/1819 (2013.01); H04L 5/0055 (2013.01); H04W 76/27 (2018.02); H04W 80/02 (2013.01)

(58) Field of Classification Search
CPC .... H04L 1/1819; H04L 5/0055; H04W 76/27; H04W 80/02
See application file for complete search history.

(56) References Cited

U.S. PATENT DOCUMENTS 10,313,970 B2 * 6/2019 Cai ................. H04W 76/28
2019/0059102 A1 * 2/2019 Yerramalli ........... H04L 1/1825
(Continued)

FOREIGN PATENT DOCUMENTS

EP 2273844 A1 1/2011
KR 10-2019-0029817 * 3/2019
WO WO-2020065530 A1 * 4/2020 ........... H04B 7/1851

OTHER PUBLICATIONS

ETRI: "Discussion on More Delay-Tolerant Re-Transmission Mechanisms for NTN," 3GPP Draft, 3GPP TSG RAN1 WG1 Meeting #99, R1-1912641, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 18, 2019-Nov. 22, 2019, Nov. 8, 2019 (Nov. 8, 2019), XP051820143, 3 pages, Retrieved from the Internet: URL: https://ftp.3gpp.org/tsg_ran/WG1_RL1/TSGR1_99/Docs/R1-1912641.zip [retrieved on Nov. 8, 2019] Section 2.2; p. 2.

(Continued)

Primary Examiner — Michael J Moore, Jr.
(74) Attorney, Agent, or Firm — Holland & Hart LLP

(57) ABSTRACT

Methods, systems, and devices for wireless communications are described in which a physical layer at a user equipment (UE) or a base station may generate feedback for one or more communications that are attempted to be received from a transmitting device. The physical layer feedback may be communicated to the transmitting device in higher layer communications, such as in a medium access control (MAC) layer control element (CE), where the MAC layer is a higher layer than the physical layer in a multi-layer protocol stack (Continued)

of the UE and base station. The physical layer feedback may be communicated after being triggered by one or more conditions at the UE or base station.

30 Claims, 23 Drawing Sheets

(51) Int. Cl.
*H04L 1/1812* (2023.01)
*H04W 80/02* (2009.01)

(56) References Cited

U.S. PATENT DOCUMENTS

| | | | | |
|---|---|---|---|---|
| 2020/0107371 | A1* | 4/2020 | Kunt | H04W 76/27 |
| 2020/0228251 | A1* | 7/2020 | Yeo | H04L 1/1822 |
| 2020/0366427 | A1* | 11/2020 | Wang | H04L 1/1861 |
| 2020/0396023 | A1* | 12/2020 | Wang | H04L 1/08 |
| 2020/0413289 | A1* | 12/2020 | Akkarakaran | H04L 1/1896 |
| 2021/0075501 | A1* | 3/2021 | Xu | H04B 7/18519 |
| 2021/0250905 | A1* | 8/2021 | Liu | H04L 1/1864 |
| 2021/0258104 | A1* | 8/2021 | Ye | H04W 76/11 |
| 2021/0266109 | A1* | 8/2021 | Shrestha | H04L 1/1896 |
| 2021/0266957 | A1* | 8/2021 | Shrestha | H04W 74/008 |
| 2021/0288756 | A1* | 9/2021 | Shrestha | H04L 1/1812 |
| 2021/0385020 | A1* | 12/2021 | Määttänen | H04L 1/1893 |
| 2021/0391952 | A1* | 12/2021 | Hofström | H04L 1/1812 |
| 2022/0045803 | A1* | 2/2022 | Lin | H04L 1/1822 |
| 2022/0077972 | A1* | 3/2022 | Rico Alvarino | H04W 72/042 |
| 2022/0158770 | A1* | 5/2022 | Hong | H04W 72/14 |
| 2022/0239417 | A1* | 7/2022 | Cheng | H04L 1/1896 |
| 2022/0240283 | A1* | 7/2022 | Hong | H04L 1/18 |
| 2022/0330298 | A1* | 10/2022 | Cheng | H04W 72/1273 |

OTHER PUBLICATIONS

International Search Report and Written Opinion—PCT/US2021/018580—ISA/EPO—dated May 10, 2021.

* cited by examiner

ACKNOWLEDGMENT FEEDBACK TECHNIQUES IN WIRELESS COMMUNICATIONS WITH LARGE PROPAGATION DELAYS

CROSS REFERENCE

The present application for patent claims the benefit of U.S. Provisional Patent Application No. 62/980,098 by SHRESTHA et al., entitled "ACKNOWLEDGMENT FEEDBACK TECHNIQUES IN WIRELESS COMMUNICATIONS WITH LARGE PROPAGATION DELAYS," filed Feb. 21, 2020, assigned to the assignee hereof, and expressly incorporated by reference herein.

FIELD OF TECHNOLOGY

The following relates generally to wireless communications and more specifically to acknowledgment feedback techniques in wireless communications with large propagation delays.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, there may be a large distance between a UE and a base station (e.g., the UE and the base station may be a part of a non-terrestrial network (NTN), among other examples). Because of the distance between UEs and base stations in such cases, there may be a relatively long round-trip delay or propagation delay in message transmissions between a UE and base station (e.g., relative to terrestrial networks). Efficient techniques for managing communications with such relatively long round-trip or propagation delays are thus desirable for such systems.

SUMMARY

The described techniques relate to improved methods, systems, devices, and apparatuses that support acknowledgment feedback techniques in wireless communications with large propagation delays. In accordance with various aspects, a physical layer at a user equipment (UE) or a base station may generate feedback for one or more communications that are attempted to be received (e.g., hybrid acknowledgment repeat request (HARQ) acknowledgment/negative-acknowledgment (ACK/NACK) feedback). The physical layer feedback may be communicated to the transmitting device in higher layer communications, such as in a medium access control (MAC) layer control element (CE), where the MAC layer is a higher layer than the physical layer in a multi-layer protocol stack of the UE and base station. In some cases, the MAC-CE may be a fixed length data or information transmission that provides feedback information for a number of feedback processes. In other cases, the MAC-CE may be a variable length data or information transmission that includes a feedback process identification (ID) and a number of retransmissions associated with the feedback process ID.

In some cases, physical layer feedback may be disabled and not communicated between the UE and base station unless triggered by one or more conditions at the UE or base station. In some cases, the conditions that may trigger the transmission of the physical layer feedback may include one or more of an unsuccessful receipt of one or more communications at the physical layer, a number of feedback processes with a NACK, a number of retransmissions associated with one or more feedback process IDs, a synchronization error at the physical layer, a configured periodic timing for physical layer feedback, or a request to provide physical layer feedback. Techniques such as discussed herein may allow for communication of physical layer feedback information that may enable more efficient retransmissions of data and thereby enhance the efficiency and reliability of the associated wireless communications system.

A method of wireless communication at a UE is described. The method may include receiving one or more downlink transmissions from a base station via a wireless connection with the base station, determining physical layer feedback for the one or more downlink transmissions, and transmitting the physical layer feedback in one or more higher layer communications with the base station. In some cases, the physical layer feedback is determined at a physical layer of a protocol stack at the UE that is a lower layer than one or more higher layers used to transmit the higher layer communications.

An apparatus for wireless communication at a UE is described. The apparatus may include a processor, memory coupled with the processor, and instructions stored in the memory. The instructions may be executable by the processor to cause the apparatus to receive one or more downlink transmissions from a base station via a wireless connection with the base station, determine physical layer feedback for the one or more downlink transmissions, and transmit the physical layer feedback in one or more higher layer communications with the base station. In some cases, the physical layer feedback is determined at a physical layer of a protocol stack at the UE that is a lower layer than one or more higher layers used to transmit the higher layer communications.

Another apparatus for wireless communication at a UE is described. The apparatus may include means for receiving one or more downlink transmissions from a base station via a wireless connection with the base station, determining physical layer feedback for the one or more downlink transmissions, and transmitting the physical layer feedback in one or more higher layer communications with the base station. In some cases, the physical layer feedback is determined at a physical layer of a protocol stack at the UE that is a lower layer than one or more higher layers used to transmit the higher layer communications.

A non-transitory computer-readable medium storing code for wireless communication at a UE is described. The code may include instructions executable by a processor to receive one or more downlink transmissions from a base station via a wireless connection with the base station, determine physical layer feedback for the one or more downlink transmissions, and transmit the physical layer feedback in one or more higher layer communications with the base station. In some cases, the physical layer feedback is determined at a physical layer of a protocol stack at the UE that is a lower layer than one or more higher layers used to transmit the higher layer communications.

In some examples of the method, apparatuses, and non-transitory computer-readable medium described herein, the one or more higher layer communications include a MAC layer communications, and where the transmitting the physical layer feedback includes, and transmitting a MAC-CE that indicates feedback for one or more physical layer acknowledgment feedback processes. In some examples of the method, apparatuses, and non-transitory computer-readable medium described herein, the MAC-CE may be identified by a reserved logical channel identification (LCID) or new extended LCID that is associated with acknowledgment feedback for the UE. Some examples of the method, apparatuses, and non-transitory computer-readable medium described herein may further include operations, features, means, or instructions for receiving, from the base station prior to the receiving the one or more downlink transmissions, configuration information that disables the physical layer feedback reports and that enables the higher layer communications for transmission of the physical layer feedback.

Some examples of the method, apparatuses, and non-transitory computer-readable medium described herein may further include operations, features, means, or instructions for determining to transmit the physical layer feedback in the one or more higher layer communications based on an indication associated with communications between the UE and the base station. In some examples of the method, apparatuses, and non-transitory computer-readable medium described herein, the indication associated with communications between the UE and the base station includes one or more of a physical layer indication of an unsuccessful receipt of the one or more downlink transmissions, a number of feedback processes with a negative acknowledgment exceeds a threshold value, a number of number of transmissions for the same feedback process exceeds a threshold value, a physical layer indication of a synchronization error, an expiration of a timer associated with physical layer synchronization, a timing for a periodic indication of feedback, a request from the base station to transmit the physical layer feedback, or any combinations thereof.

In some examples of the method, apparatuses, and non-transitory computer-readable medium described herein, the higher layer communications include one or more fixed size data or information transmissions for reporting a predetermined number of physical layer acknowledgment feedback processes to the base station. In some examples of the method, apparatuses, and non-transitory computer-readable medium described herein, the higher layer communications include a channel quality report associated with a number of feedback processes having a negative acknowledgment feedback status. In some examples of the method, apparatuses, and non-transitory computer-readable medium described herein, the higher layer communications include one or more variable sized data or information transmissions that each provide an identification of one or more feedback processes. In some examples of the method, apparatuses, and non-transitory computer-readable medium described herein, the higher layer communications further include one or more of a feedback process identification and a number of times that data associated with the feedback process identification was attempted to be decoded at the UE.

Some examples of the method, apparatuses, and non-transitory computer-readable medium described herein may further include operations, features, means, or instructions for transmitting one or more uplink communications to the base station, receiving, from the base station via higher layer signaling, one or more physical layer feedback reports associated with the one or more uplink communications, and retransmitting one or more uplink communications based on the one or more physical layer feedback reports. In some examples of the method, apparatuses, and non-transitory computer-readable medium described herein, a first MAC-CE format is configured at the UE for transmission of the physical layer feedback for the one or more downlink transmissions, and a second MAC-CE format is configured at the UE for reception of the one or more physical layer feedback reports associated with the one or more uplink communications.

Some examples of the method, apparatuses, and non-transitory computer-readable medium described herein may further include operations, features, means, or instructions for transmitting, to the base station, a capability message that indicates the UE is capable to communicate physical layer feedback in one or more higher layer communications with the base station. Some examples of the method, apparatuses, and non-transitory computer-readable medium described herein may further include operations, features, means, or instructions for receiving, from the base station, signaling that indicates higher layer communications are to be used for physical layer feedback. In some examples of the method, apparatuses, and non-transitory computer-readable medium described herein, the signaling that indicates higher layer communications are to be used for physical layer feedback is received in broadcast information from the base station, in RRC signaling from the base station, or combinations thereof.

Some examples of the method, apparatuses, and non-transitory computer-readable medium described herein may further include operations, features, means, or instructions for receiving, subsequent to the transmitting the physical layer feedback in the one or more higher layer communications, a resource grant for retransmission of the physical layer feedback, and retransmitting the physical layer feedback in the one or more higher layer communications based on the resource grant.

A method of wireless communication at a UE is described. The method may include receiving one or more downlink transmissions from a base station via a wireless connection with the base station, determining physical layer feedback for the one or more downlink transmissions, where the physical layer feedback is associated with a physical layer of a protocol stack of the UE that is a lower layer than one or more higher layers of the protocol stack, identifying that one or more conditions associated with the wireless connection indicate that the physical layer feedback is to be provided to the base station, and transmitting, responsive to the identifying, the physical layer feedback to the base station.

An apparatus for wireless communication at a UE is described. The apparatus may include a processor, memory coupled with the processor, and instructions stored in the memory. The instructions may be executable by the processor to cause the apparatus to receive one or more downlink transmissions from a base station via a wireless connection with the base station, determine physical layer feedback for the one or more downlink transmissions, where the physical layer feedback is associated with a physical layer of a protocol stack of the UE that is a lower layer than one or more higher layers of the protocol stack, identify that one or more conditions associated with the wireless connection indicate that the physical layer feedback is to be provided to the base station, and transmit, responsive to the identifying, the physical layer feedback to the base station.

Another apparatus for wireless communication at a UE is described. The apparatus may include means for receiving one or more downlink transmissions from a base station via a wireless connection with the base station, determining physical layer feedback for the one or more downlink transmissions, where the physical layer feedback is associated with a physical layer of a protocol stack of the UE that is a lower layer than one or more higher layers of the protocol stack, identifying that one or more conditions associated with the wireless connection indicate that the physical layer feedback is to be provided to the base station, and transmitting, responsive to the identifying, the physical layer feedback to the base station.

A non-transitory computer-readable medium storing code for wireless communication at a UE is described. The code may include instructions executable by a processor to receive one or more downlink transmissions from a base station via a wireless connection with the base station, determine physical layer feedback for the one or more downlink transmissions, where the physical layer feedback is associated with a physical layer of a protocol stack of the UE that is a lower layer than one or more higher layers of the protocol stack, identify that one or more conditions associated with the wireless connection indicate that the physical layer feedback is to be provided to the base station, and transmit, responsive to the identifying, the physical layer feedback to the base station.

Some examples of the method, apparatuses, and non-transitory computer-readable medium described herein may further include operations, features, means, or instructions for disabling, prior to the receiving the one or more downlink transmissions, physical layer reports of feedback for a wireless connection between the UE and a base station, and transmitting the physical layer feedback in a higher layer communication with the base station. In some examples of the method, apparatuses, and non-transitory computer-readable medium described herein, the higher layer communication may be a MAC layer communication that includes a MAC-CE that includes the physical layer feedback.

In some examples of the method, apparatuses, and non-transitory computer-readable medium described herein, the identifying may include operations, features, means, or instructions for receiving an indication from the physical layer that one or more of the downlink transmissions were unsuccessfully decoded. In some examples of the method, apparatuses, and non-transitory computer-readable medium described herein, the indication from the physical layer indicates that decoding failed for one or more feedback process identifications, or that a number of unsuccessful decoding attempts of one or more of the downlink transmissions exceeds a threshold value. In some examples of the method, apparatuses, and non-transitory computer-readable medium described herein, the threshold value may be configured by RRC signaling received from the base station.

In some examples of the method, apparatuses, and non-transitory computer-readable medium described herein, the identifying may include operations, features, means, or instructions for determining that a number of feedback processes for which decoding of an associated downlink transmission is unsuccessful exceeds a threshold number. In some examples of the method, apparatuses, and non-transitory computer-readable medium described herein, the identifying may include operations, features, means, or instructions for receiving a synchronization error indication from the physical layer. In some examples of the method, apparatuses, and non-transitory computer-readable medium described herein, the identifying may include operations, features, means, or instructions for determining that a timer associated with physical layer synchronization has expired.

In some examples of the method, apparatuses, and non-transitory computer-readable medium described herein, the identifying may include operations, features, means, or instructions for determining that a periodic physical layer feedback report is to be transmitted to the base station. In some examples of the method, apparatuses, and non-transitory computer-readable medium described herein, a periodic reporting interval may be configured by the base station having a periodicity that is based on a propagation delay between the UE and the base station. In some examples of the method, apparatuses, and non-transitory computer-readable medium described herein, the identifying may include operations, features, means, or instructions for receiving a request from the base station to transmit the physical layer feedback.

Some examples of the method, apparatuses, and non-transitory computer-readable medium described herein may further include operations, features, means, or instructions for transmitting one or more uplink communications to the base station, receiving, from the base station via higher layer signaling, one or more physical layer feedback reports associated with the one or more uplink communications, and retransmitting one or more uplink communications based on the one or more physical layer feedback reports. In some examples of the method, apparatuses, and non-transitory computer-readable medium described herein, a first MAC-CE format may be configured at the UE for transmission of the physical layer feedback for the one or more downlink transmissions, and a second MAC-CE may be configured at the UE for reception of the one or more physical layer feedback reports associated with the one or more uplink communications.

A method of wireless communication at a base station is described. The method may include transmitting one or more downlink communications to a UE via a wireless connection with the UE, receiving a physical layer feedback report in a higher layer communication from the UE, where the physical layer feedback is associated with a physical layer of a protocol stack at the UE that is a lower layer than one or more higher layers of the protocol stack, and retransmitting one or more of the downlink communication to the UE based on the physical layer feedback report.

An apparatus for wireless communication at a base station is described. The apparatus may include a processor, memory coupled with the processor, and instructions stored in the memory. The instructions may be executable by the processor to cause the apparatus to transmit one or more downlink communications to a UE via a wireless connection with the UE, receive a physical layer feedback report in a higher layer communication from the UE, where the physical layer feedback is associated with a physical layer of a protocol stack at the UE that is a lower layer than one or more higher layers of the protocol stack, and retransmit one or more of the downlink communication to the UE based on the physical layer feedback report.

Another apparatus for wireless communication at a base station is described. The apparatus may include means for transmitting one or more downlink communications to a UE via a wireless connection with the UE, receiving a physical layer feedback report in a higher layer communication from the UE, where the physical layer feedback is associated with a physical layer of a protocol stack at the UE that is a lower layer than one or more higher layers of the protocol stack, and retransmitting one or more of the downlink communication to the UE based on the physical layer feedback report.

A non-transitory computer-readable medium storing code for wireless communication at a base station is described. The code may include instructions executable by a processor to transmit one or more downlink communications to a UE via a wireless connection with the UE, receive a physical layer feedback report in a higher layer communication from the UE, where the physical layer feedback is associated with a physical layer of a protocol stack at the UE that is a lower layer than one or more higher layers of the protocol stack, and retransmit one or more of the downlink communication to the UE based on the physical layer feedback report.

In some examples of the method, apparatuses, and non-transitory computer-readable medium described herein, the higher layer communication from the UE may be a MAC layer communication that includes a MAC-CE that indicates feedback for one or more physical layer acknowledgment feedback processes of the UE. In some examples of the method, apparatuses, and non-transitory computer-readable medium described herein, the MAC-CE includes a reserved LCID or a new extended LCID that is associated with acknowledgment feedback for the UE.

Some examples of the method, apparatuses, and non-transitory computer-readable medium described herein may further include operations, features, means, or instructions for transmitting, to the UE, configuration information that disables physical layer reports of feedback and that enables the higher layer communications for transmission of the physical layer feedback report.

Some examples of the method, apparatuses, and non-transitory computer-readable medium described herein may further include operations, features, means, or instructions for configuring the UE to transmit the physical layer feedback report in the higher layer communication based on one or more of a physical layer indication of an unsuccessful receipt of the one or more downlink transmissions, a number of feedback processes with a negative acknowledgment exceeds a threshold value, a number of number of transmissions for the same feedback process exceeds a threshold value, a physical layer indication of a synchronization error, an expiration of a timer associated with physical layer synchronization, a timing for a periodic indication of feedback, a request from the base station to transmit the physical layer feedback, or any combinations thereof.

In some examples of the method, apparatuses, and non-transitory computer-readable medium described herein, the higher layer communication includes one or more fixed size data or information transmissions for reporting a predetermined number of physical layer feedback processes of the UE. In some examples of the method, apparatuses, and non-transitory computer-readable medium described herein, the higher layer communication includes a channel quality report associated with a number of feedback processes having a negative acknowledgment feedback status. In some examples of the method, apparatuses, and non-transitory computer-readable medium described herein, the higher layer communication includes one or more variable sized data or information transmissions that each provide an identification of one or more feedback processes at the UE. In some examples of the method, apparatuses, and non-transitory computer-readable medium described herein, the higher layer communication further includes one or more of a feedback process identification and a number of times that data associated with the feedback process identification was attempted to be decoded at the UE.

Some examples of the method, apparatuses, and non-transitory computer-readable medium described herein may further include operations, features, means, or instructions for receiving one or more uplink communications from the UE, determining physical layer feedback associated with the one or more uplink communications, and transmitting, to the UE via higher layer signaling, one or more physical layer feedback reports associated with the one or more uplink communications. In some examples of the method, apparatuses, and non-transitory computer-readable medium described herein, a first MAC-CE format may be configured at the UE for transmission of the physical layer feedback report for the one or more downlink transmissions, and a second MAC-CE format may be configured at the UE for reception of the one or more physical layer feedback reports associated with the one or more uplink communications.

Some examples of the method, apparatuses, and non-transitory computer-readable medium described herein may further include operations, features, means, or instructions for receiving, from the UE, a capability message that indicates the UE is capable to communicate physical layer feedback in one or more higher layer communications with the base station. Some examples of the method, apparatuses, and non-transitory computer-readable medium described herein may further include operations, features, means, or instructions for transmitting, to the UE, signaling that indicates the higher layer communication is to be used for physical layer feedback. In some examples of the method, apparatuses, and non-transitory computer-readable medium described herein, the signaling that indicates the higher layer communication is to be used for physical layer feedback is transmitted in broadcast information from the base station, in RRC signaling from the base station, or combinations thereof.

Some examples of the method, apparatuses, and non-transitory computer-readable medium described herein may further include operations, features, means, or instructions for transmitting, responsive to a failure to decode the physical layer acknowledgment feedback report in the higher layer communication, a resource grant for retransmission of the physical layer feedback, and monitoring for a retransmission of the physical layer feedback report in the one or more higher layer communications based on the resource grant.

A method of wireless communication at a base station is described. The method may include transmitting one or more downlink transmissions to a UE via a wireless connection with the UE, identifying that one or more conditions associated with the wireless connection indicate that physical layer feedback is to be provided to the base station, and receiving, responsive to the identifying, the physical layer feedback from the UE, where the physical layer feedback is associated with a physical layer of a protocol stack of the UE that is a lower layer than one or more higher layers of the protocol stack of the UE.

An apparatus for wireless communication at a base station is described. The apparatus may include a processor, memory coupled with the processor, and instructions stored in the memory. The instructions may be executable by the processor to cause the apparatus to transmit one or more downlink transmissions to a UE via a wireless connection with the UE, identify that one or more conditions associated with the wireless connection indicate that physical layer feedback is to be provided to the base station, and receive, responsive to the identifying, the physical layer feedback from the UE, where the physical layer feedback is associated with a physical layer of a protocol stack of the UE that is a lower layer than one or more higher layers of the protocol stack of the UE.

Another apparatus for wireless communication at a base station is described. The apparatus may include means for transmitting one or more downlink transmissions to a UE via a wireless connection with the UE, identifying that one or more conditions associated with the wireless connection indicate that physical layer feedback is to be provided to the base station, and receiving, responsive to the identifying, the physical layer feedback from the UE, where the physical layer feedback is associated with a physical layer of a protocol stack of the UE that is a lower layer than one or more higher layers of the protocol stack of the UE.

A non-transitory computer-readable medium storing code for wireless communication at a base station is described. The code may include instructions executable by a processor to transmit one or more downlink transmissions to a UE via a wireless connection with the UE, identify that one or more conditions associated with the wireless connection indicate that physical layer feedback is to be provided to the base station, and receive, responsive to the identifying, the physical layer feedback from the UE, where the physical layer feedback is associated with a physical layer of a protocol stack of the UE that is a lower layer than one or more higher layers of the protocol stack of the UE.

Some examples of the method, apparatuses, and non-transitory computer-readable medium described herein may further include operations, features, means, or instructions for disabling physical layer reports of the physical layer feedback prior to the transmitting the one or more downlink transmissions to the UE, and receiving the physical layer feedback in a higher layer communication from the UE. In some examples of the method, apparatuses, and non-transitory computer-readable medium described herein, the higher layer communication may be a MAC layer communication that includes a MAC-CE that includes the physical layer feedback.

Some examples of the method, apparatuses, and non-transitory computer-readable medium described herein may further include operations, features, means, or instructions for configuring the UE to transmit the physical layer feedback based on one or more conditions at the UE. In some examples of the method, apparatuses, and non-transitory computer-readable medium described herein, a physical layer indication that one or more of the downlink transmissions were unsuccessfully decoded, or, and a physical layer indication that decoding failed for one or more feedback process identifications, or that a number of unsuccessful decoding attempts of one or more of the downlink transmissions exceeds a threshold value. In some examples of the method, apparatuses, and non-transitory computer-readable medium described herein, the one or more conditions at the UE includes a number of feedback processes for which decoding of an associated downlink transmission is unsuccessful exceeds a threshold number. In some examples of the method, apparatuses, and non-transitory computer-readable medium described herein, the one or more conditions at the UE include a synchronization error at the physical layer of the UE. In some examples of the method, apparatuses, and non-transitory computer-readable medium described herein, the one or more conditions at the UE include an expiration of a timer associated with physical layer synchronization. In some examples of the method, apparatuses, and non-transitory computer-readable medium described herein, the one or more conditions at the UE include a timing associated with a periodic physical layer feedback report.

Some examples of the method, apparatuses, and non-transitory computer-readable medium described herein may further include operations, features, means, or instructions for configuring the UE with the timing for periodic physical layer feedback reports based on a propagation delay between the UE and the base station. Some examples of the method, apparatuses, and non-transitory computer-readable medium described herein may further include operations, features, means, or instructions for transmitting a request to the UE to transmit the physical layer feedback, and where the receiving is performed responsive to the request.

Some examples of the method, apparatuses, and non-transitory computer-readable medium described herein may further include operations, features, means, or instructions for receiving one or more uplink communications from the UE, determining physical layer feedback associated with the one or more uplink communications, and transmitting, to the UE via higher layer signaling, one or more physical layer feedback reports associated with the one or more uplink communications. In some examples of the method, apparatuses, and non-transitory computer-readable medium described herein, a first MAC-CE format may be configured at the UE for transmission of the physical layer feedback for the one or more downlink transmissions, and a second MAC-CE may be configured at the UE for reception of the one or more physical layer feedback reports associated with the one or more uplink communications.

DETAILED DESCRIPTION

Figure 1:
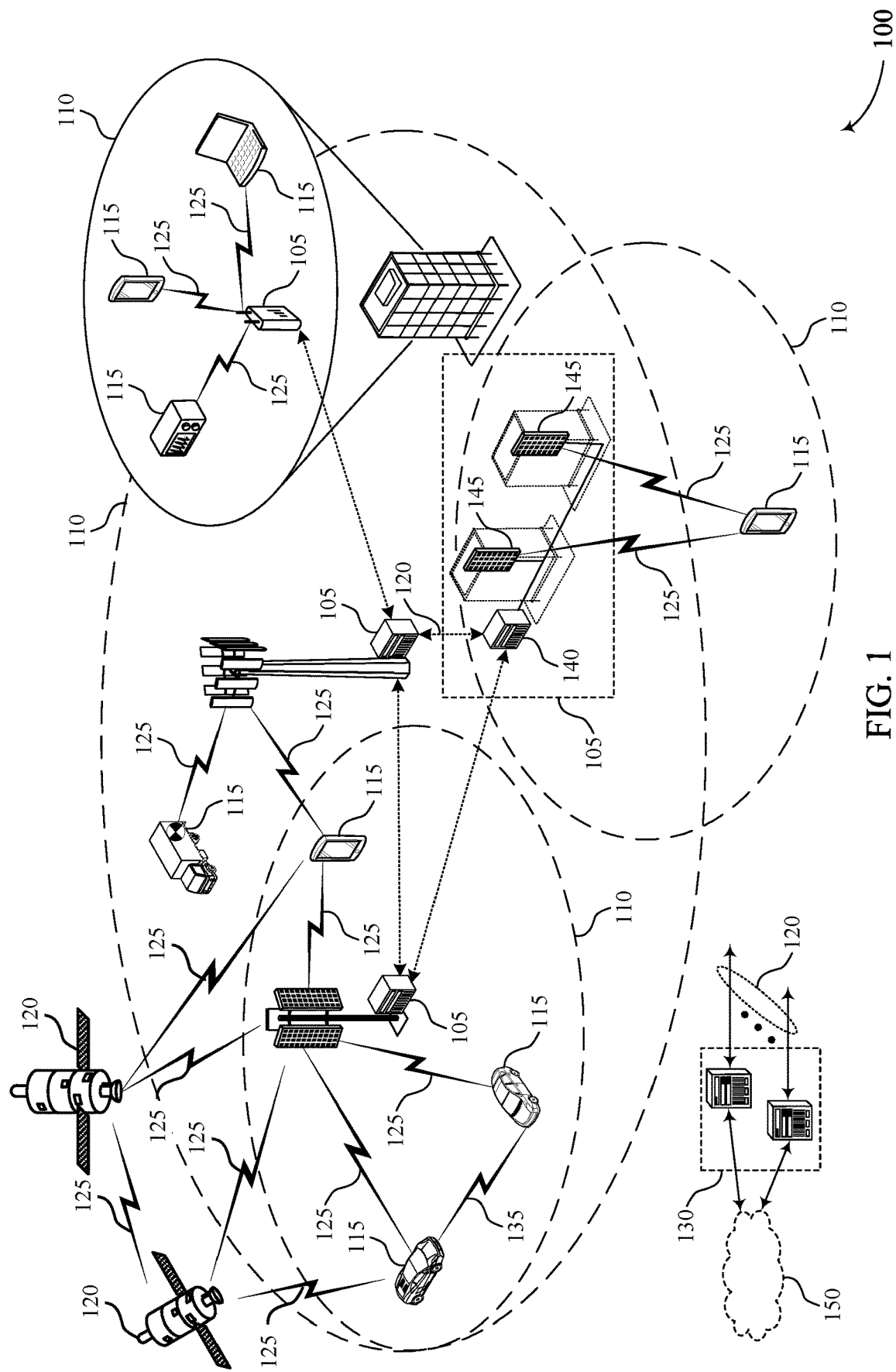
FIG. 1 illustrates an example of a system for wireless communications that supports acknowledgment feedback techniques in wireless communications with large propagation delays in accordance with aspects of the present disclosure.

In some cases, there may be a relatively long distance between a transmitter and a receiver, such as a base station and a user equipment (UE), in a wireless communications system. For example, non-terrestrial networks (sometimes referred to as NTNs) may provide wireless connectivity using high altitude devices, such as satellites, that may act as base stations or relays in a wireless communications system. NTNs may involve the use of high altitude platform stations (HAPSs) and/or satellites to provide coverage for terrestrial base stations and UEs. The terms HAPS and satellite are used interchangeably herein to refer to a remote NTN device that may provide coverage to one or more other high altitude or terrestrial devices. Some satellites in an NTN may operate as base stations, and UEs may communicate directly with a serving satellite. In other cases, base stations or other satellites may relay transmissions between a serving satellite and a UE. Satellites operate in a variety of earth orbits, and in certain distances from the surface of the earth. For example, satellites may function in low-earth orbit (LEO), medium earth orbit (MEO) geostationary earth orbit (GEO), geosynchronous orbit (GSO), highly elliptical orbits (HEO), or another type of orbit. Each type of orbit may be defined for certain ranges of distances away from the surface of the earth.

In such systems, the distance between a UE and a serving satellite may be much greater than typical distances between a UE and a base station in a terrestrial network, and in some cases, the satellite and the UE may be thousands of kilometers apart, and it may take some time for electromagnetic waves to propagate over the distance between the satellite and the UE. Thus, the propagation delay for NTNs may be many orders of magnitude larger than the propagation delay for terrestrial networks. As such, the round trip delay (sometimes referred to as an RTD) associated with a signal may also be orders of magnitude larger for non-terrestrial networks than for terrestrial networks.

The long round trip delay associated with NTNs may cause issues with downlink and uplink hybrid automatic repeat request (HARQ) processes that may run at a physical layer of a multi-layer protocol stack. For instance, retransmission associated with HARQ processes may take much longer in NTN communications system when compared to a terrestrial network because of the long propagation delay and associated round trip delay of signals. In some wireless communication systems, a UE may support a maximum quantity of HARQ processes running in parallel per slot (e.g., sixteen (16) parallel HARQ processes per slot). As the round trip delay increases, the amount of time it takes to resolve a HARQ process may also increase, and in some instances HARQ processes may stall while waiting for resolution. Various aspects of the present disclosure provide that physical layer HARQ feedback may be disabled in order to avoid stalling of HARQ processes. However, simply disabling physical layer HARQ feedback may result in an increase in an amount of retransmissions of higher layer data, such as higher layer protocol data units (PDUs). Such higher layer retransmissions may consume additional resources and have longer latency relative to physical layer retransmissions, as an entire PDU may be retransmitted rather than a physical layer transport block (TB) or code block (CB) that may be associated with a HARQ process.

In accordance with various aspects of the present disclosure, physical layer feedback may be generated at a UE or a base station for one or more feedback process IDs (e.g., HARQ acknowledgment/negative-acknowledgment (ACK/NACK) feedback), and communicated to a transmitting device using higher layer communications. In some cases, the physical layer feedback may be communicated to the transmitting device in a medium access control (MAC) layer control element (CE), where the MAC layer is a higher layer than the physical layer. In some cases, the MAC-CE may be a fixed length data or information transmission that provides feedback information for a number of feedback processes. In other cases, the MAC-CE may be a variable length data or information transmission that includes a feedback process ID and a number of retransmissions associated with the feedback process ID.

In some cases, physical layer feedback may be disabled and not communicated between the UE and base station unless triggered by one or more conditions at the UE or base station. In some cases, the conditions that may trigger the transmission of the physical layer feedback may include one or more of an unsuccessful receipt of one or more communications at the physical layer, a number of feedback processes with a NACK, a number of retransmissions of associated with one or more feedback process IDs, a synchronization error at the physical layer, a configured periodic timing for physical layer feedback, or a request to provide physical layer feedback.

Particular aspects of the subject matter described herein may be implemented to realize one or more advantages. For example, the described techniques may support improvements in latency and resource usage through providing physical layer feedback and associated retransmissions rather than higher layer retransmissions. Thus, techniques as discussed herein may enhance the reliability and efficiency of the wireless communications system. Such techniques may also decrease power consumption at a UE through reduced higher layer retransmissions which may include more data than physical layer retransmissions, among other advantages. As such, supported techniques may include improved network operations and, in some examples, may promote network efficiencies, among other benefits.

Aspects of the disclosure are initially described in the context of exemplary wireless communications systems. Aspects of the disclosure are also illustrated by protocol stack diagrams, MAC-CE formats, and process flow diagrams. Aspects of the disclosure are further illustrated by and described with reference to apparatus diagrams, system diagrams, and flowcharts that relate to dynamically configurable acknowledgement procedures.

FIG. 1 illustrates an example of a wireless communications system 100 that supports acknowledgment feedback techniques in wireless communications with large propagation delays in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links (e.g., via an S1, N2, N3, or other interface). The base stations 105 may communicate with one another over the backhaul links (e.g., via an X2, Xn, or other interface) either directly (e.g., directly between base stations 105), or indirectly (e.g., via core network 130), or both. In some examples, the backhaul links may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 includes base stations 105, UEs 115, satellites 120, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Wireless communications system 100 may also include one or more satellites 120. Satellite 120 may communicate with base stations 105 and UEs 115 (or other high altitude or terrestrial communications devices). Satellite 120 may be any suitable type of communication satellite configured to relay communications between different end nodes in a wireless communication system. Satellite 120 may be an example of a space satellite, a balloon, a dirigible, an airplane, a drone, an unmanned aerial vehicle, and/or the like. In some examples, the satellite 120 may be in a geosynchronous or geostationary earth orbit, a low earth orbit or a medium earth orbit. A satellite 120 may be a multi-beam satellite configured to provide service for multiple service beam coverage areas in a predefined geographical service area. The satellite 120 may be any distance away from the surface of the earth.

In some cases, a cell may be provided or established by a satellite 120 as part of a non-terrestrial network. A satellite 120 may, in some cases, perform the functions of a base station 105, act as a bent-pipe satellite, or may act as a regenerative satellite, or a combination thereof. In other cases, satellite 120 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 120) may receive a signal from a base station 105 and may relay the signal to a UE 115 or base station 105, or vice-versa.

UEs 115 may communicate with satellites 120 and/or base stations 105 using communications links 125. In some cases, a physical layer at a UE 115 may generate feedback for one or more communications that are attempted to be received (e.g., HARQ ACK/NACK feedback), and the physical layer feedback may be communicated to the satellite 120 in higher layer communications. In some cases, the higher layer communications may include a MAC-CE. In some cases, the MAC-CE may be a fixed length data or information transmission that provides feedback information for a number of feedback processes. In other cases, the MAC-CE may be a variable length data or information transmission that includes a feedback process ID and a number of retransmissions associated with the feedback process ID. In some cases, the MAC-CE may include a channel quality report that is provided for a number of feedback processes that had a failure or a largest number of retransmissions.

In some cases, physical layer feedback may be disabled and not communicated between the UE 115 and satellite 120 unless triggered by one or more conditions at the UE 115 or satellite 120. In some cases, the conditions that may trigger the transmission of the physical layer feedback may include one or more of an unsuccessful receipt of one or more communications at the physical layer, a number of feedback processes with a NACK, a number of retransmissions of associated with one or more feedback process IDs, a synchronization error at the physical layer, a configured periodic timing for physical layer feedback, or a request to provide physical layer feedback.

Figure 2:
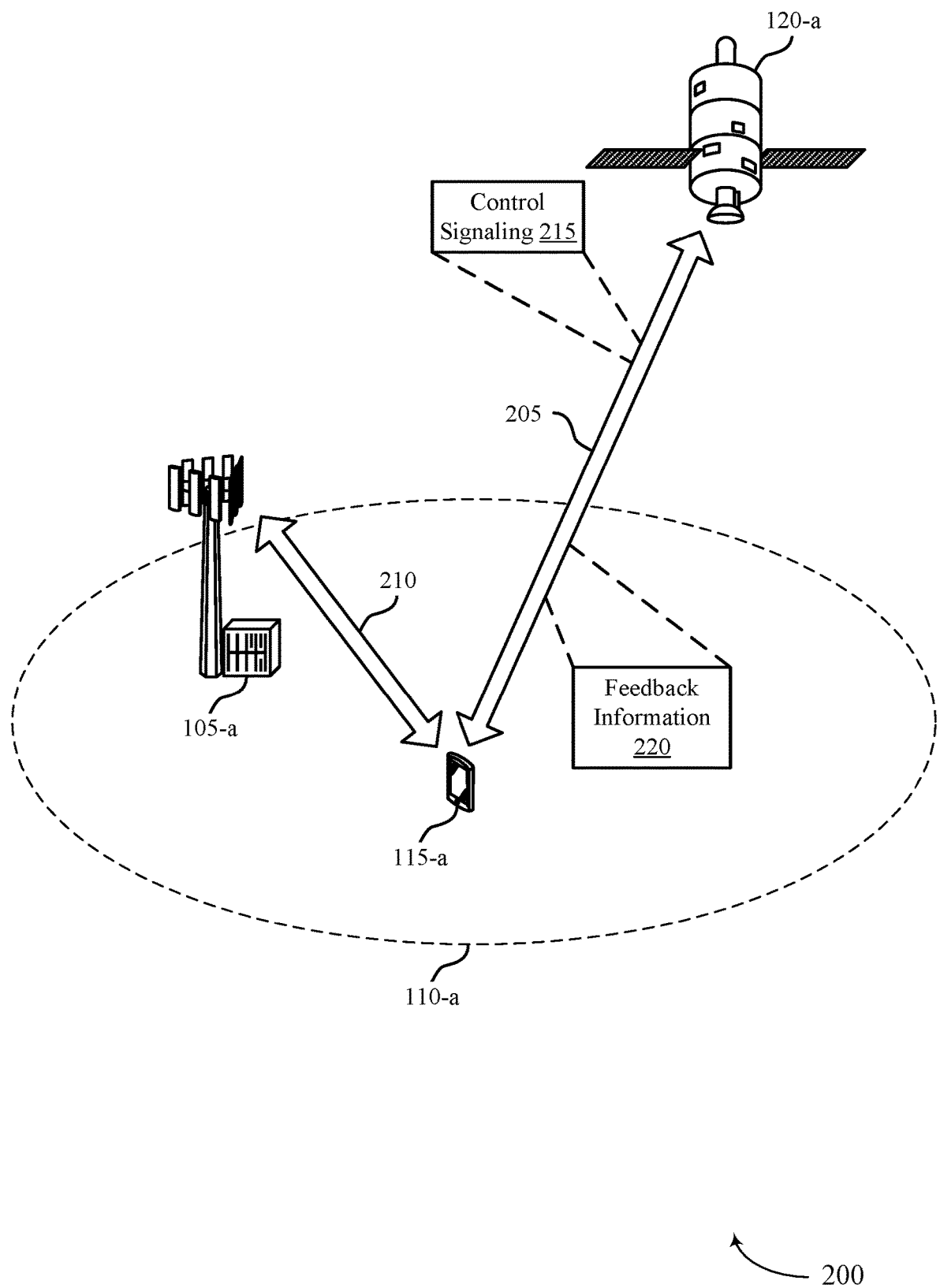
FIG. 2 illustrates an example of a portion of a wireless communications system that supports acknowledgment feedback techniques in wireless communications with large propagation delays in accordance with aspects of the present disclosure.

FIG. 2 illustrates an example of a wireless communications system 200 that supports acknowledgment feedback techniques in wireless communications with large propagation delays in accordance with aspects of the present disclosure. In some examples, wireless communications system 200 may implement aspects of wireless communications system 100. Wireless communications system 200 may include a base station 105-a, a UE 115-a, and a satellite 120-a, which may be examples of a base station 105, UEs 115, and satellites 120 as described with reference to FIG. 1. The base station 105-a may serve a coverage area 110-a in cases of a terrestrial network, and the satellite 120-a may serve coverage area 110-a in cases of an NTN. The UE 115-a may communicate with the satellite 120-a by transmitting signaling in a communication link 205 (e.g., a transmission channel), and the UE 115-a may optionally communicate with the base station 105-a by transmitting signaling in another communication link 210. In some cases that provide NTN wireless communications, the satellite 120-a may be the serving base station for the UE 115-a.

The satellite 120-a may orbit the earth's surface at a particular altitude. The distance between the satellite 120-a and the UE 115-a may be much greater than the distance between the base station 105-a and the UE 115-a. The distance between the UE 115-a and the satellite 120-a may cause an increased RTD in communications between the UE 115-a and the satellite 120-a. The UE 115-a may determine to connect to the base station 105-a and/or the satellite 120-a using a random access procedure (e.g., a four-step RACH or a two-step RACH) to establish a connection (e.g., to initiate a RRC connection establishment procedure).

In the example of FIG. 2, the UE 115-a may establish a connection with satellite 120-a, and may receive control signaling 215 from the satellite 120-a. As discussed herein, in some cases physical layer feedback may be disabled at the UE 115-a through the control signaling 215. In such cases, the UE 115-a may continue to process physical layer communications and determine physical layer feedback (e.g., HARQ ACK/NACK feedback) and determine HARQ feedback for configured HARQ process IDs. Thus, in such cases when physical layer HARQ feedback is disabled, the HARQ process and HARQ retransmission scheme can still be used. In some cases, in order to provide information to the network on which HARQ processes are successful or are not successful and require a retransmission, feedback information 220 may be transmitted using higher layer signaling of a protocol stack that is used at the UE 115-a, the base station 105-a, and the satellite 120-a. An example of a protocol stack and higher versus lower layers is discussed with reference to FIG. 3.

In some cases, a HARQ feedback MAC-CE is defined to report the HARQ feedback in the feedback information 220. In some cases, the MAC-CE may include a logical channel ID (LCID) that may be a reserved LCID or a new extended LCID for uplink shared channel communications, and that indicates that the MAC-CE includes physical layer feedback information. Various examples of MAC-CE formats are discussed with reference to FIGS. 4A and 4B.

In some cases, transmission of the feedback information 220 may be triggered based on one or more conditions that are present at the UE 115-a or the satellite 120-a. For example, HARQ feedback transmission may be triggered based on one or more of a number of different conditions, or combinations thereof. Such conditions may include, for example, when the physical layer at the UE 115-a indicates a problem in the reception of a downlink transmission (e.g., a physical downlink shared channel (PDSCH) transmission) for a HARQ process ID, or a problem in the reception of a downlink transmission for a threshold number of retransmissions, where the threshold number of retransmissions may be configured by the base station 105-a or satellite 120-a (e.g., configured by RRC dedicated signaling). Conditions that may trigger transmission of physical layer feedback may also include when more than a threshold number of HARQ processes require retransmission (e.g., a threshold number of HARQ processes with NACK, where the threshold value is preconfigured at the UE 115-a or provided by the satellite 120-a or base station 105-a). Trigger conditions may also include a number of number of transmissions for a same feedback process exceeds a threshold value (e.g., a HARQ process with at least a threshold number of retransmissions, where the threshold value is preconfigured at the UE 115-a or provided by the satellite 120-a or base station 105-a).

Trigger conditions may also include a reception at a higher layer greater than a threshold number of "out-of-sync" indications from the physical layer (e.g., a threshold value of one or more out-of-sync indications that may be preconfigured or provided to the UE 115-a). Trigger conditions may also include when a timer (e.g., a T310 timer) is started upon reception of an "out-of-sync" indication from the physical layer (e.g., a N310 out of sync indication). Trigger conditions may also include a periodic configuration in which physical layer feedback can be periodic transmissions, where a periodicity can be configured by the satellite 120-a or base station 105-a, for example. In some cases, the periodicity may be set to correspond to the round trip time considering the propagation delay between UE 115-a and satellite 120-a, which may allow the UE 115-a to report the physical layer feedback for all feedback processes at once using the higher layer communications. Such a feedback transmission may allow the satellite 120-a to perform one or more retransmissions as needed. Trigger conditions may also include a request from the satellite 120-a to transmit the feedback report (e.g., in a dynamic request received via RRC or PDCCH signaling). In some cases, one or more combinations of different trigger conditions may be used.

Using such techniques, the UE 115-a may transmit feedback information for one or more downlink transmissions, which may prompt one or more retransmissions from the satellite 120-a. While the above examples, are described for providing feedback for downlink communications, such techniques may also be used to provide physical layer feedback for uplink communications as well, in which the satellite 120-a may transmit physical layer feedback in a MAC-CE to the UE 115-a. In some cases, separate HARQ feedback MAC CE formats, reserved LCIDs, new extended LCIDs, or combinations thereof may be defined for uplink and downlink physical layer feedback. In some cases, the UE 115-a may transmit capability information that indicates that the UE 115-a supports MAC-CE communications that provide physical layer feedback. In such cases, the satellite 120-a or base station 105-a may configure the UE 115-a to use the MAC-CE for physical layer feedback. In some cases, if the higher layer communication with the physical layer feedback (e.g., the MAC-CE with physical layer HARQ feedback) is not received by the network, a retransmission grant for the higher layer communication for physical layer feedback may be provided, which may indicate to the UE 115-a that the initial physical layer feedback communication was not successfully received at the satellite 120-a.

Figure 3:
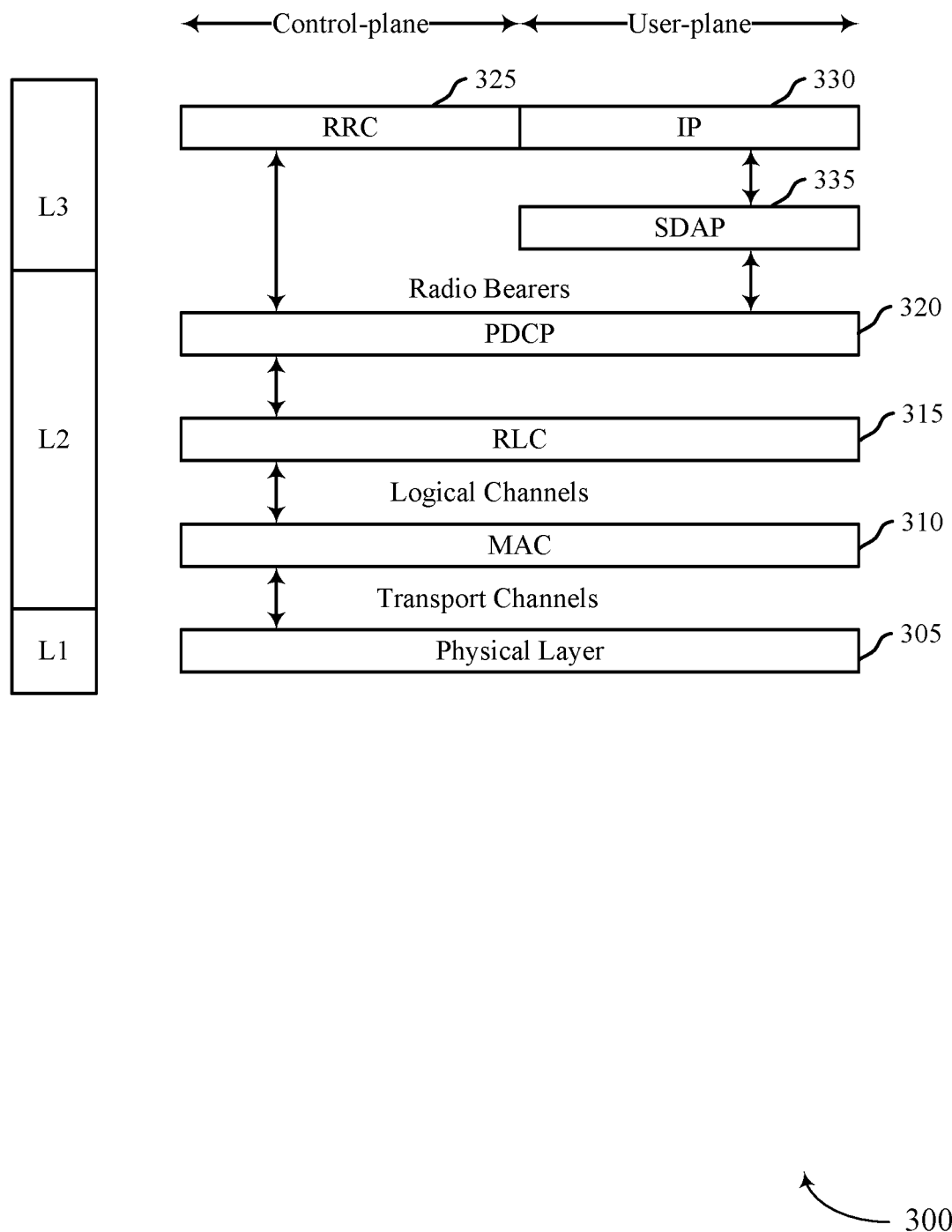
FIG. 3 illustrates an example of a protocol stack that supports acknowledgment feedback techniques in wireless communications with large propagation delays in accordance with aspects of the present disclosure.

FIG. 3 illustrates an example of a protocol stack 300 that supports acknowledgment feedback techniques in wireless communications with large propagation delays in accordance with aspects of the present disclosure. In some examples, protocol stack 300 may implement aspects of wireless communications system 100 or 200. Aspects of protocol stack 300 may be implemented by a base station, satellite, and/or a UE, which may be examples of the corresponding transmitting and/or receiving devices described herein.

The protocol stack 300 is shown with three layers: Layer 1, Layer 2, and Layer 3. L1 layer is the lowest layer and implements various physical layer signal processing functions, and is referred to herein as the physical layer. L1 may include the physical sublayer 305 which monitors, controls, or otherwise manages aspects of the wireless transmissions over the wireless medium. L2 layer is above the physical sublayer 305 (e.g., above L1) and is responsible for managing aspects of the wireless link between the UE and network device (or base station) over the physical sublayer 305.

L2 includes a MAC sublayer 310, a RLC sublayer 315, and a PDCP sublayer 320, which are terminated at the network device on the network side. There may be several upper layers above the L2 including a network layer (e.g., IP sublayer 330) that may be terminated at a PDN gateway on the network side, and an application layer that is terminated at the other end of the connection (e.g., far end UE, server, etc.).

The PDCP sublayer 320 provides multiplexing between different radio bearers and logical channels. The PDCP sublayer 320 also provides header compression for upper layer data packets to reduce radio transmission overhead, security by ciphering the data packets, and handover support for UEs between network devices. The PDCP sublayer 320 also manages integrity protection (on the transmitter side) and/or verification (on the receiver side), packet expiry timer operations, packet ordering/reordering operations, and the like. The RLC sublayer 315 provides segmentation and reassembly of upper layer data packets, retransmission of lost data packets, and reordering of data packets to compensate for out-of-order reception due to HARQ. The RLC sublayer 315 passes data to the MAC sublayer 310 as logical channels.

A logical channel may define what type of information is being transmitted over the air interface (e.g., user traffic, control channels, broadcast information, etc.). In some aspects, two or more logical channels may be combined into a logical channel group (LCG). By comparison, the transport channel defines how information is being transmitted over the air interface (e.g., encoding, interleaving, etc.) and the physical channel defines where information is being transmitted over the air interface (e.g., which symbols of the slot, subframe, fame, etc., are carrying the information).

In the control plane, the radio protocol architecture for the UE and network device is substantially the same for the physical sublayer 305 and the L2 with the exception that there is no header compression function for the control plane. The control plane also includes a RRC sublayer 325 in L3. The RRC sublayer 325 is responsible for obtaining radio resources (i.e., radio bearers) and for configuring the lower layers using RRC signaling between the network device and the UE.

In some examples, protocol stack 300 may also include a service data adaptation protocol (SDAP) sublayer 335 between the IP sublayer 330 and the PDCP sublayer 320. The SDAP sublayer 335 may perform functions such as mapping between QoS flow and DRB, marking QoS flow ID in both downlink and uplink packets, and the like. In some aspects, a single protocol entity for SDAP sublayer 335 may be configured for each individual PDU session, except for dual-connectivity configuration where two entities can be configured. As discussed, the PDCP sublayer 320 may manage aspects of integrity protection and/or packet ordering for wireless transmissions.

In accordance with aspects described herein, HARQ feedback for one or more transmissions may be determined at the physical sublayer 305, and may be transmitted using higher layer communications, such as in a MAC sublayer 310 MAC-CE.

Figure 4A:
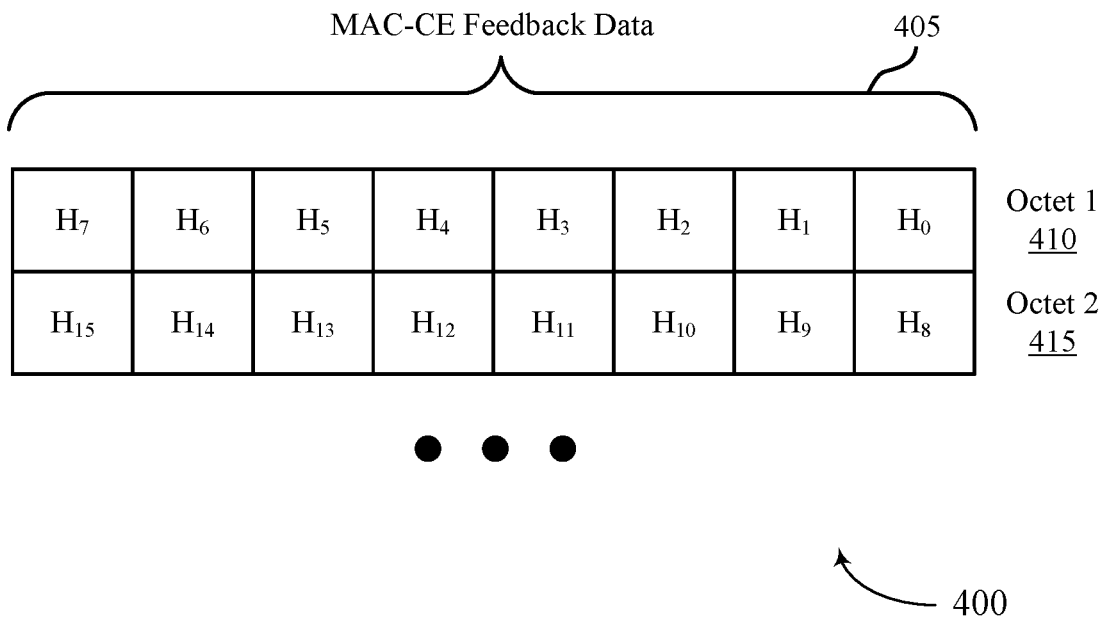
FIGS. 4A and 4B illustrate examples of MAC-CE formats that support acknowledgment feedback techniques in wireless communications with large propagation delays in accordance with aspects of the present disclosure.
Figure 4B:
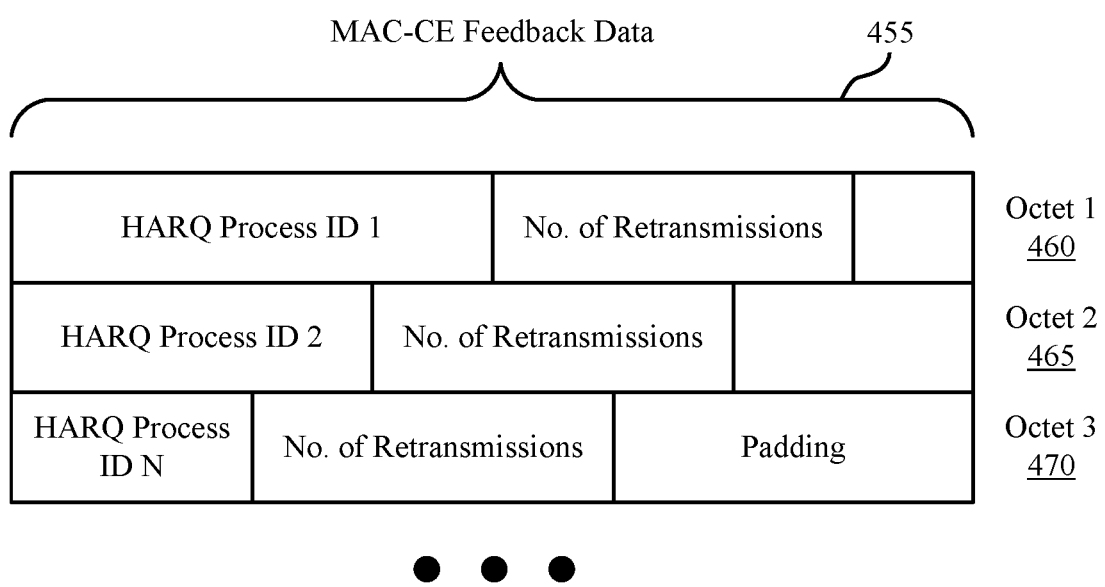

FIGS. 4A and 4B illustrate examples of MAC-CE formats 400 and 450 that support acknowledgment feedback techniques in wireless communications with large propagation delays in accordance with aspects of the present disclosure. In some examples, MAC-CE formats 400 and 450 may be implemented in aspects of wireless communications system 100 or 200.

In the example of FIG. 4A, MAC-CE format 400 may include MAC-CE feedback data 405 that is provided in a fixed size MAC-CE 400. The fixed size MAC-CE 400 in this example provides two bytes of information, although the size may be increased or decreased based on a number of configured HARQ processes at the UE, base station, or satellite. In the two-byte example of FIG. 4A, a first octet 410 may include a bitmap for a first set of eight HARQ processes $H_0$ through $H_7$, and a second octet 415 may include a bitmap for a second set of eight HARQ processes $H_8$ through $H_{15}$. In some cases, a value of zero (0) in the bitmap may indicate no issue occurred whereas a value of one (1) may indicate that there was problem in the HARQ process.

In other cases, the physical layer feedback may be provided in other types of MAC-CEs. For example, in some cases, a downlink channel quality report may be provided for a first X number HARQ process which suffered from failure or X HARQ processes that have a highest number of retransmissions.

In other cases, such as illustrated in the example of FIG. 4B, MAC-CE format 450 may provide a variable-size MAC-CE that provides MAC-CE feedback data 455 that indicates a HARQ process ID (e.g., a 4 bits ID) and a corresponding number of times the data is attempted to be decoded (x>1 bits). In the example of FIG. 4B, a first octet 460 may include a first HARQ process ID and number of associated retransmissions, as well as one or more initial bits of a second HARQ process ID. A second octet 465 may include remaining bits of the second HARQ process ID, a number of associated retransmissions, as well as one or more initial bits of a third HARQ process ID. A third octet 470 may include remaining bits of the third HARQ process ID, a number of associated retransmissions. A last octet of the MAC-CE feedback data 455, corresponding to the third octet 470 in the example of FIG. 4B, may include one or more padding bits, in the event that one or more available bits of the associated octet are unused.

Figure 5:
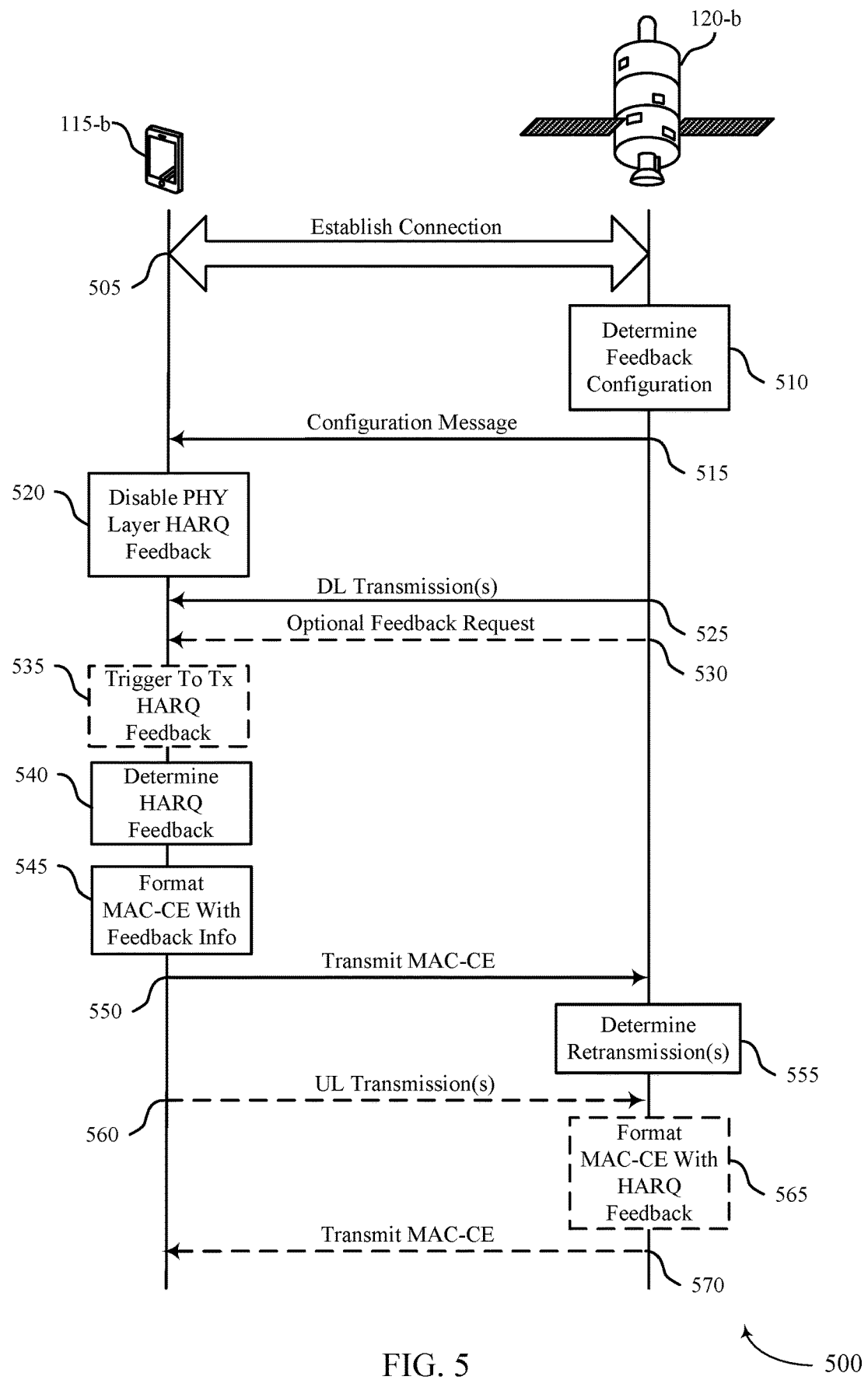
FIG. 5 illustrates an example of a process flow that supports acknowledgment feedback techniques in wireless communications with large propagation delays in accordance with aspects of the present disclosure.

FIG. 5 illustrates an example of a process flow 500 that supports acknowledgment feedback techniques in wireless communications with large propagation delays in accordance with aspects of the present disclosure. In some examples, process flow 500 may implement aspects of wireless communications system 100 or 200. The process flow 500 may illustrate an example of providing physical layer feedback using higher layer communications. UE 115-b may be an example of UEs 115 as described with reference to FIGS. 1 and 2. Satellite 120-b may be an example of satellites 120 as described with reference to FIGS. 1 and 2. Satellite 120-b may be an example of a non-terrestrial base station. In some cases, satellite 120-b may instead be a base station 105 in a terrestrial network that is located a relatively large distance from UE 115-b, or the operations described herein may be performed by a combination of the satellite 120-b and a base station. Alternative examples of the following may be implemented, where some steps are performed in a different order than described or are not performed at all. In some cases, steps may include additional features not mentioned below, or further steps may be added.

At 505, the satellite 120-b and UE 115-b may establish a connection. In some cases, the connection may be established according to connection establishment techniques such as through transmission of a random access request and associated random access response, and control signaling for RRC connection establishment.

At 510, the satellite 120-b may determine a feedback configuration for the UE 115-b. In some cases, the satellite 120-b may determine that physical layer HARQ feedback is to be disabled. For example, the satellite 120-b may determine that a round trip time associated with communications with the UE 115-b exceeds a value that may provide for efficient physical layer feedback communications (e.g., due to HARQ processes stalling while waiting for HARQ process resolution). In some cases, the satellite 120-b may determine to configure the UE 115-b to provide physical layer feedback using higher layer communications, in accordance with techniques as discussed herein. In some cases, the determination to configure the physical layer feedback for transmission in higher layer communications may be based on one or more conditions, such as discussed with reference to FIG. 2, identified at the satellite 120-b, or that may be reported by the UE 115-b.

At 515, the satellite 120-b may transmit a configuration message (e.g., via control signaling such as DCI, an RRC message, a SIB, among other examples of control signaling) to the UE 115-b. The configuration message may indicate that physical layer feedback reporting is disabled, and may indicate that higher layer communications with the physical layer feedback information are to be provided. In some examples, the satellite 120-b may determine one or more parameters for communication of the higher layer signaling, such as an LCID associated with a MAC-CE that is to be used to communicate the physical layer feedback.

At 520, the UE 115-b may receive the configuration message and disable the physical layer HARQ feedback. In some cases, the UE 115-b may still perform HARQ processes at the physical layer, in accordance with a configured number of HARQ process IDs, but not transmit the physical layer HARQ feedback using physical layer communications.

At 525, the satellite 120-b may transmit one or more downlink communications to the UE 115-b.

Optionally, at 530, the satellite 120-b may transmit a feedback request to the UE 115-b. Optionally, at 535, the UE 115-b may determine that one or more conditions are present that trigger the transmission of physical layer HARQ feedback using higher layer communications. Such conditions that may trigger the higher layer transmission may include one or more conditions such as discussed with respect to FIG. 2.

At 540, the UE 115-b may determine physical layer HARQ feedback associated with the one or more downlink transmissions from the satellite 120-b. The physical layer HARQ feedback may be determined for configured HARQ process IDs, based on whether each downlink transmission has been successfully decoded or not. At 545, the UE 115-b may format a MAC-CE with the physical layer feedback. The MAC-CE may have a format such as discussed with reference to FIGS. 4A and 4B. At 550, the UE 115-b may transmit the MAC-CE to the satellite 120-b.

At 555, the satellite 120-b may receive the MAC-CE with the physical layer feedback, and determine one of more HARQ process IDs that were unsuccessfully received at the UE 115-b, and determine whether one or more retransmissions are needed for one or more of the downlink transmissions. In some cases, the satellite 120-b may identify the MAC-CE as having physical layer feedback based on a reserved LCID or an extended reserved LCID of the MAC-CE that indicates the feedback information.

As discussed, while various examples discuss providing physical layer feedback for downlink transmissions in one or more higher layer communications, such techniques may be used to provide feedback for uplink communications as well. In the example of FIG. 5, the UE 115-b may optionally, at 560, transmit one or more uplink transmissions to the satellite 120-b. Optionally, at 565, the satellite 120-b may determine physical layer feedback for the uplink transmissions and format a MAC-CE with the physical layer HARQ feedback. Optionally, at 570, the satellite 120-b may transmit the MAC-CE to the UE 115-b, which may determine whether one or more uplink transmissions are to be retransmitted.

Figure 6:
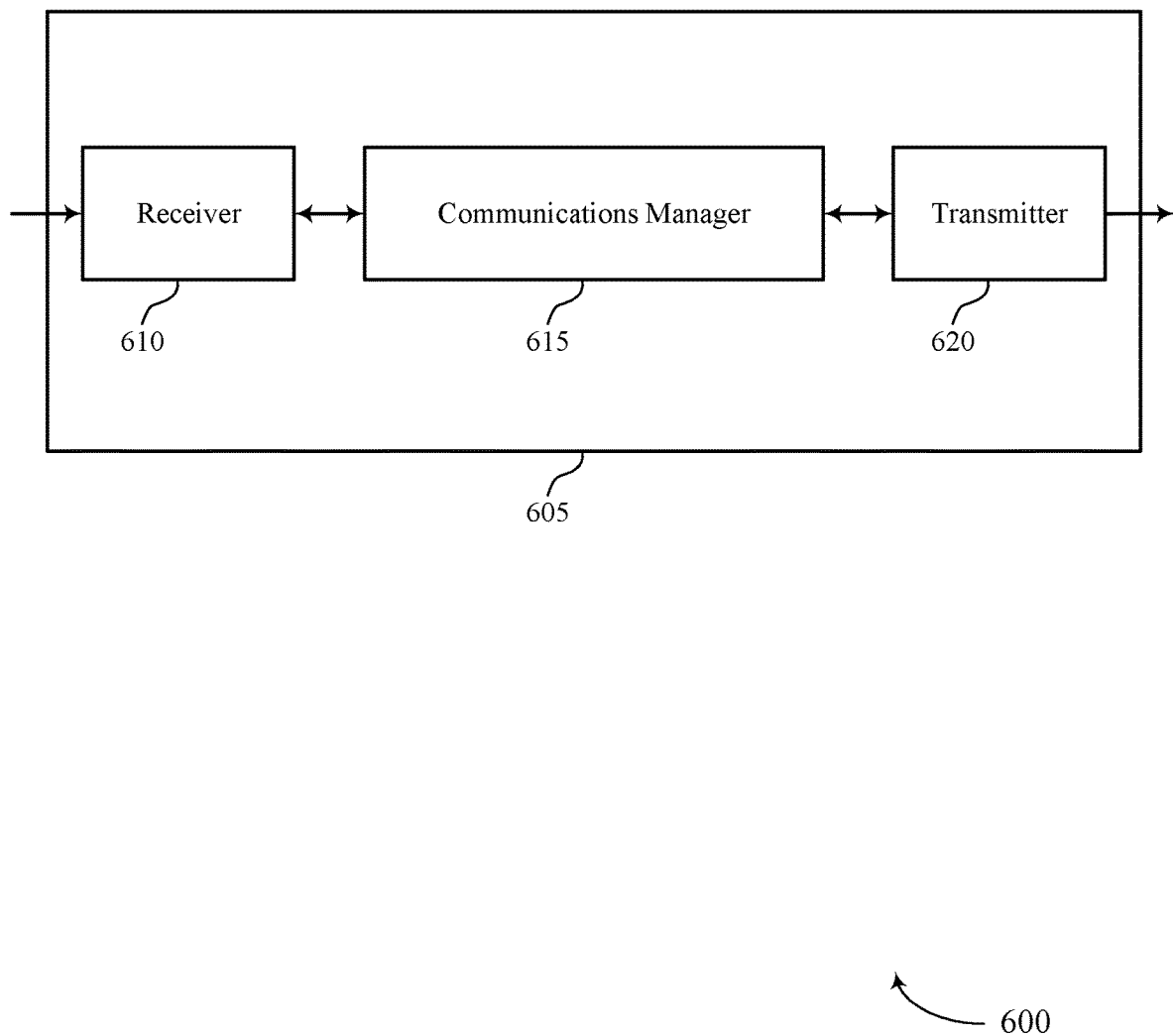
FIGS. 6 and 7 show block diagrams of devices that support acknowledgment feedback techniques in wireless communications with large propagation delays in accordance with aspects of the present disclosure.

FIG. 6 shows a block diagram 600 of a device 605 that supports acknowledgment feedback techniques in wireless communications with large propagation delays in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to acknowledgment feedback techniques in wireless communications with large propagation delays, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive one or more downlink transmissions from a base station via a wireless connection with the base station, determine physical layer feedback for the one or more downlink transmissions, and transmit the physical layer feedback in one or more higher layer communications with the base station. The physical layer feedback may be determined at a physical layer of a protocol stack at the UE that is a lower layer than one or more higher layers used to transmit the higher layer communications.

The communications manager 615 may also receive one or more downlink transmissions from a base station via a wireless connection with the base station, determine physical layer feedback for the one or more downlink transmissions, where the physical layer feedback is determined at a physical layer of a protocol stack of the UE that is a lower layer than one or more higher layers of the protocol stack, identify that one or more conditions associated with the wireless connection indicate that the physical layer feedback is to be provided to the base station, and transmit, responsive to the identifying, the physical layer feedback to the base station. The communications manager 615 may be an example of aspects of the communications manager 910 described herein.

The communications manager 615 may as described herein be implemented to realize one or more potential advantages. One implementation may allow the device 605 to provide physical layer feedback (e.g., physical layer HARQ feedback) without stalling a physical layer feedback process due to large propagation delays and round trip times between the device 605 and a transmitting device such as a base station or satellite. Such physical layer feedback may allow for enhanced reliability and reduced latency compared to cases where physical layer feedback may be disabled and higher layer retransmissions used in the event of unsuccessful receipt of one or more transmissions. Further, implementations may allow the device 605 to reduce the latency of communications, and increase signaling reliability, throughput, and user experience, while reducing power consumption, among other advantages.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
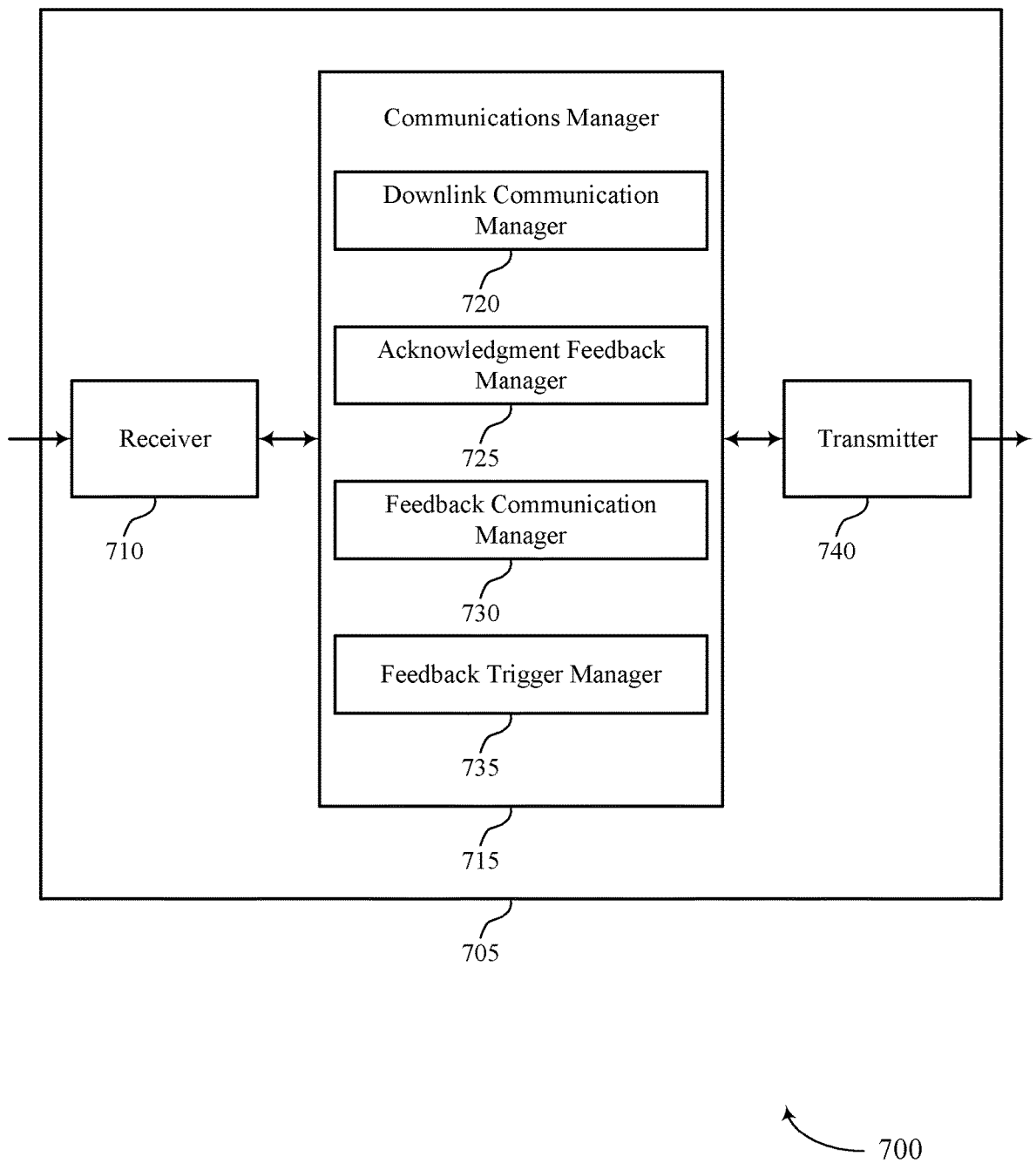

FIG. 7 shows a block diagram 700 of a device 705 that supports acknowledgment feedback techniques in wireless communications with large propagation delays in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to acknowledgment feedback techniques in wireless communications with large propagation delays, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a downlink communication manager 720, an acknowledgment feedback manager 725, a feedback communication manager 730, and a feedback trigger manager 735. The communications manager 715 may be an example of aspects of the communications manager 910 described herein.

In some cases, the downlink communication manager 720 may receive one or more downlink transmissions from a base station via a wireless connection with the base station. The acknowledgment feedback manager 725 may determine physical layer feedback for the one or more downlink transmissions. The feedback communication manager 730 may transmit the physical layer feedback in one or more higher layer communications with the base station. The physical layer feedback may be determined at a physical layer of a protocol stack at the UE that is a lower layer than one or more higher layers used to transmit the higher layer communications.

In some cases, the downlink communication manager 720 may receive one or more downlink transmissions from a base station via a wireless connection with the base station. The acknowledgment feedback manager 725 may determine physical layer feedback for the one or more downlink transmissions, where the physical layer feedback is determined at a physical layer of a protocol stack of the UE that is a lower layer than one or more higher layers of the protocol stack. The feedback trigger manager 735 may identify that one or more conditions associated with the wireless connection indicate that the physical layer feedback is to be provided to the base station. The feedback communication manager 730 may transmit, responsive to the identifying, the physical layer feedback to the base station.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
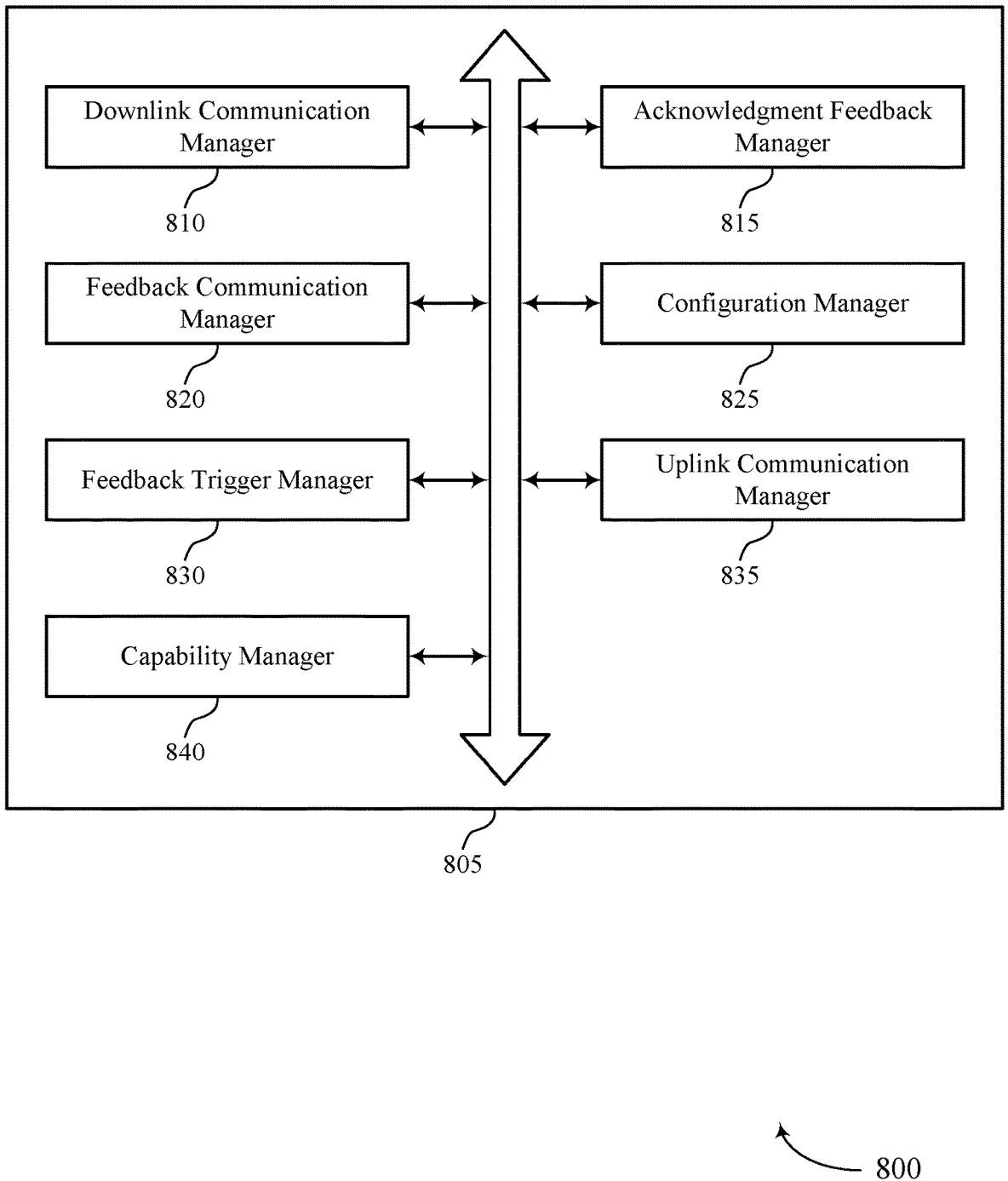
FIG. 8 shows a block diagram of a communications manager that supports acknowledgment feedback techniques in wireless communications with large propagation delays in accordance with aspects of the present disclosure.

FIG. 8 shows a block diagram 800 of a communications manager 805 that supports acknowledgment feedback techniques in wireless communications with large propagation delays in accordance with aspects of the present disclosure. The communications manager 805 may be an example of aspects of a communications manager 615, a communications manager 715, or a communications manager 910 described herein. The communications manager 805 may include a downlink communication manager 810, an acknowledgment feedback manager 815, a feedback communication manager 820, a configuration manager 825, a feedback trigger manager 830, an uplink communication manager 835, and a capability manager 840. Each of these modules may communicate, directly or indirectly, with one another (e.g., via one or more buses).

The downlink communication manager 810 may receive one or more downlink transmissions from a base station via a wireless connection with the base station.

The acknowledgment feedback manager 815 may determine physical layer feedback for the one or more downlink transmissions. In some examples, the acknowledgment feedback manager 815 may determine physical layer feedback for the one or more downlink transmissions, where the physical layer feedback is determined at a physical layer of a protocol stack of the UE that is a lower layer than one or more higher layers of the protocol stack. In some examples, the acknowledgment feedback manager 815 may receive, from the base station via higher layer signaling, one or more physical layer feedback reports associated with the one or more uplink communications. In some examples, the acknowledgment feedback manager 815 may retransmit one or more uplink communications based on the one or more physical layer feedback reports.

The feedback communication manager 820 may transmit the physical layer feedback in one or more higher layer communications with the base station, where the physical layer feedback is determined at a physical layer of a protocol stack at the UE that is a lower layer than one or more higher layers used to transmit the higher layer communications. In some examples, the feedback communication manager 820 may transmit, responsive to the identifying, the physical layer feedback to the base station. In some examples, the feedback communication manager 820 may transmit a MAC-CE that indicates feedback for one or more physical layer acknowledgment feedback processes.

In some examples, the feedback communication manager 820 may receive, subsequent to the transmitting the physical layer feedback in the one or more higher layer communications, a resource grant for retransmission of the physical layer feedback. In some examples, the feedback communication manager 820 may retransmit the physical layer feedback in the one or more higher layer communications based on the resource grant.

In some cases, the MAC-CE is identified by a reserved logical channel identification (LCID) or new extended LCID that is associated with acknowledgment feedback for the UE. In some cases, the higher layer communications include one or more fixed size data or information transmissions for reporting a predetermined number of physical layer acknowledgment feedback processes to the base station. In some cases, the higher layer communications include a channel quality report associated with a number of feedback processes having a negative acknowledgment feedback status. In some cases, the higher layer communications include one or more variable sized data or information transmissions that each provide an identification of one or more feedback processes. In some cases, the higher layer communications further include one or more of a feedback process identification and a number of times that data associated with the feedback process identification was attempted to be decoded at the UE. In some cases, a first MAC-CE format is configured at the UE for transmission of the physical layer feedback for the one or more downlink transmissions, and a second MAC-CE format is configured at the UE for reception of the one or more physical layer feedback reports associated with the one or more uplink communications.

The feedback trigger manager 830 may identify that one or more conditions associated with the wireless connection indicate that the physical layer feedback is to be provided to the base station. In some examples, the feedback trigger manager 830 may determine to transmit the physical layer feedback in the one or more higher layer communications based on an indication associated with communications between the UE and the base station. In some examples, the feedback trigger manager 830 may receive an indication from the physical layer that one or more of the downlink transmissions were unsuccessfully decoded. In some examples, the feedback trigger manager 830 may determine that a number of feedback processes for which decoding of an associated downlink transmission is unsuccessful exceeds a threshold number. In some examples, the feedback trigger manager 830 may receive a synchronization error indication from the physical layer. In some examples, the feedback trigger manager 830 may determine that a timer associated with physical layer synchronization has expired. In some examples, the feedback trigger manager 830 may determine that a periodic physical layer feedback report is to be transmitted to the base station. In some cases, a periodic reporting interval is configured by the base station having a periodicity that is based on a propagation delay between the UE and the base station. In some examples, the feedback trigger manager 830 may receive a request from the base station to transmit the physical layer feedback.

The configuration manager 825 may receive, from the base station prior to the receiving the one or more downlink transmissions, configuration information that disables the physical layer feedback reports and that enables the higher layer communications for transmission of the physical layer feedback. In some cases, the signaling that indicates higher layer communications are to be used for physical layer feedback is received in broadcast information from the base station, in RRC signaling from the base station, or combinations thereof.

The uplink communication manager 835 may transmit one or more uplink communications to the base station. The capability manager 840 may transmit, to the base station, a capability message that indicates the UE is capable to communicate physical layer feedback in one or more higher layer communications with the base station.

Figure 9:
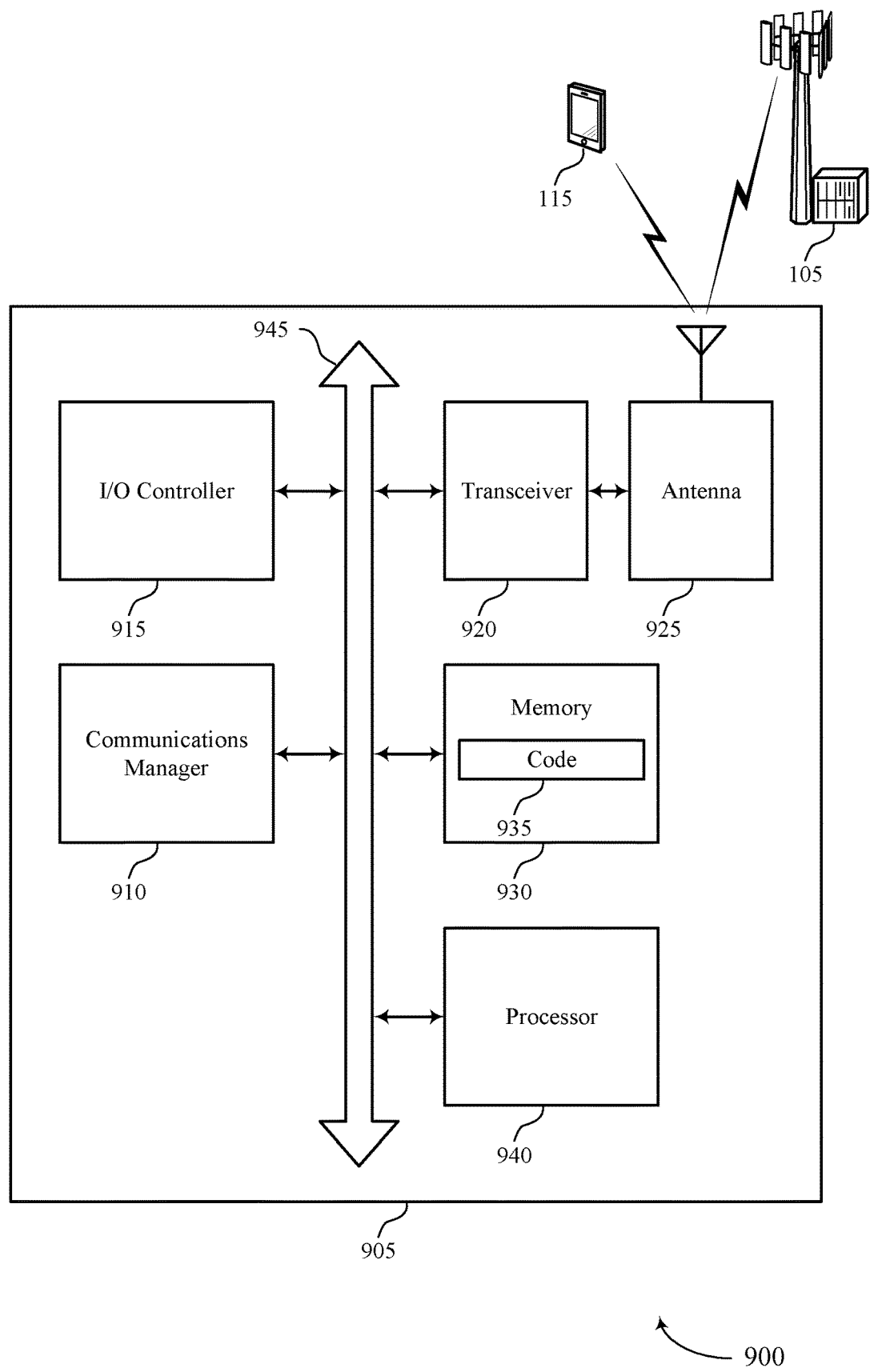
FIG. 9 shows a diagram of a system including a device that supports acknowledgment feedback techniques in wireless communications with large propagation delays in accordance with aspects of the present disclosure.

FIG. 9 shows a diagram of a system 900 including a device 905 that supports acknowledgment feedback techniques in wireless communications with large propagation delays in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive one or more downlink transmissions from a base station via a wireless connection with the base station, determine physical layer feedback for the one or more downlink transmissions, and transmit the physical layer feedback in one or more higher layer communications with the base station. The physical layer feedback may be determined at a physical layer of a protocol stack at the UE that is a lower layer than one or more higher layers used to transmit the higher layer communications.

The communications manager 910 may also receive one or more downlink transmissions from a base station via a wireless connection with the base station, determine physical layer feedback for the one or more downlink transmissions, where the physical layer feedback is determined at a physical layer of a protocol stack of the UE that is a lower layer than one or more higher layers of the protocol stack, identify that one or more conditions associated with the wireless connection indicate that the physical layer feedback is to be provided to the base station, and transmit, responsive to the identifying, the physical layer feedback to the base station.

The communications manager 910 may as described herein be implemented to realize one or more potential advantages. One implementation may allow the device 905 to provide physical layer feedback (e.g., physical layer HARQ feedback) without stalling a physical layer feedback process due to large propagation delays and round trip times between the device 905 and a transmitting device such as a base station or satellite. Such physical layer feedback may allow for enhanced reliability and reduced latency compared to cases where physical layer feedback may be disabled and higher layer retransmissions used in the event of unsuccessful receipt of one or more transmissions. Further, implementations may allow the device 905 to reduce the latency of communications, and increase signaling reliability, throughput, and user experience, while reducing power consumption, among other advantages.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting acknowledgment feedback techniques in wireless communications with large propagation delays).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
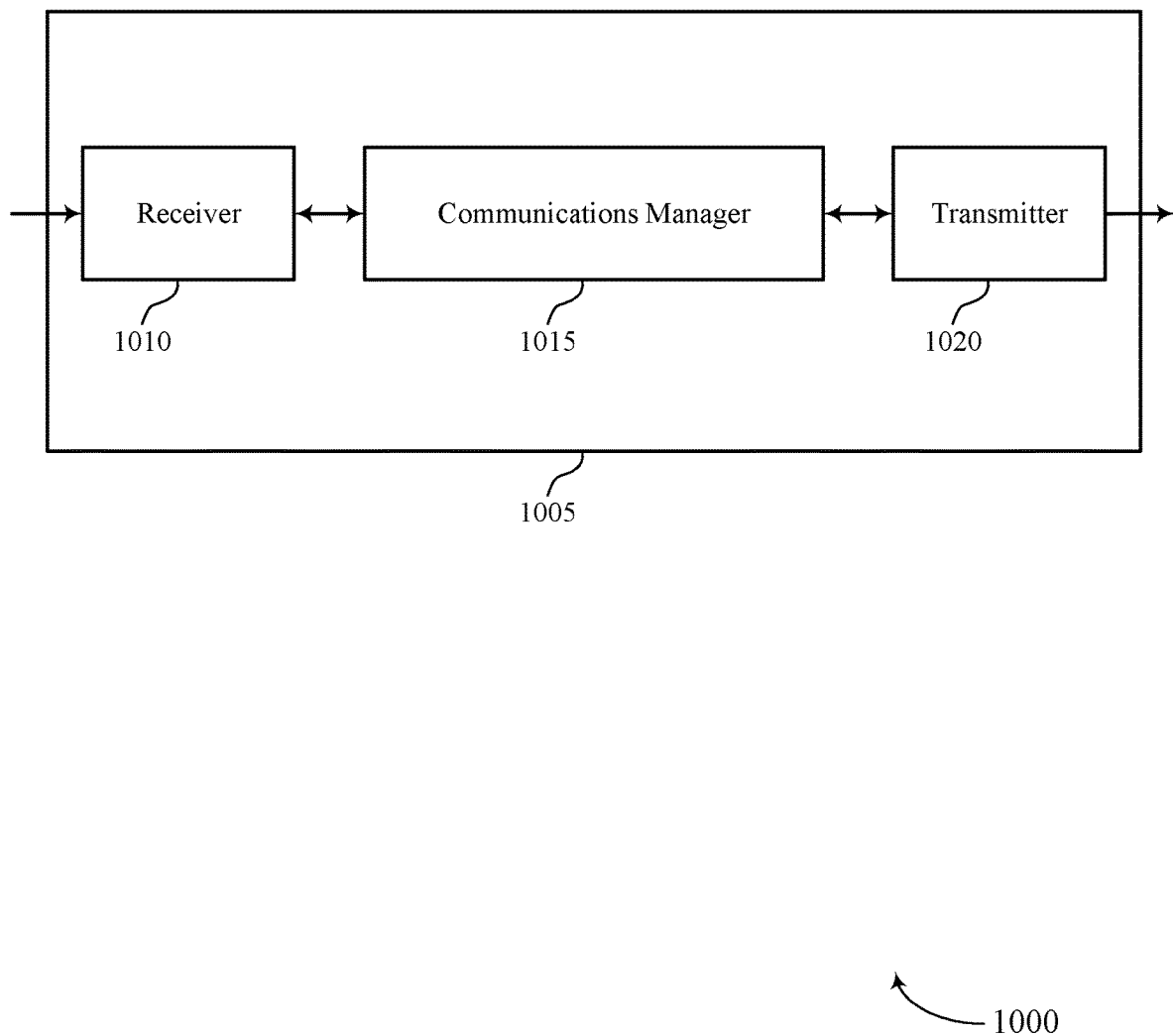
FIGS. 10 and 11 show block diagrams of devices that support acknowledgment feedback techniques in wireless communications with large propagation delays in accordance with aspects of the present disclosure.

FIG. 10 shows a block diagram 1000 of a device 1005 that supports acknowledgment feedback techniques in wireless communications with large propagation delays in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to acknowledgment feedback techniques in wireless communications with large propagation delays, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit one or more downlink communications to a UE via a wireless connection with the UE, receive a physical layer feedback report in a higher layer communication from the UE, where the physical layer feedback may be generated by a physical layer of a protocol stack at the UE that is a lower layer than one or more higher layers of the protocol stack, and retransmit one or more of the downlink communication to the UE based on the physical layer feedback report.

The communications manager 1015 may also transmit one or more downlink transmissions to a UE via a wireless connection with the UE, identify that one or more conditions associated with the wireless connection indicate that physical layer feedback is to be provided to the base station, and receive, responsive to the identifying, the physical layer feedback from the UE, where the physical layer feedback is generated by a physical layer of a protocol stack of the UE that is a lower layer than one or more higher layers of the protocol stack of the UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
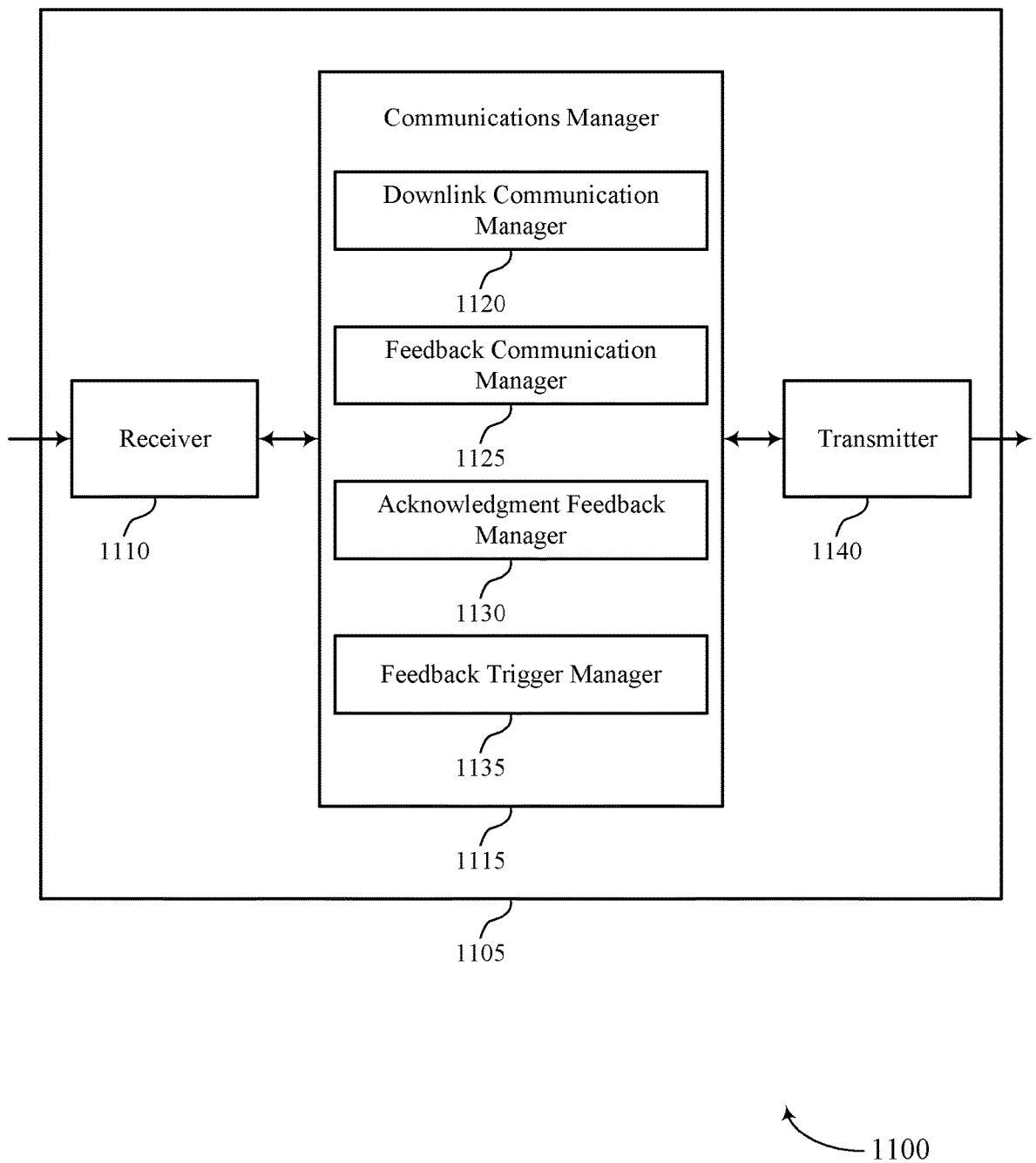

FIG. 11 shows a block diagram 1100 of a device 1105 that supports acknowledgment feedback techniques in wireless communications with large propagation delays in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to acknowledgment feedback techniques in wireless communications with large propagation delays, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a downlink communication manager 1120, a feedback communication manager 1125, an acknowledgment feedback manager 1130, and a feedback trigger manager 1135. The communications manager 1115 may be an example of aspects of the communications manager 1310 described herein.

In some cases, the downlink communication manager 1120 may transmit one or more downlink communications to a UE via a wireless connection with the UE. The feedback communication manager 1125 may receive a physical layer feedback report in a higher layer communication from the UE, where the physical layer feedback is generated by a physical layer of a protocol stack at the UE that is a lower layer than one or more higher layers of the protocol stack. The acknowledgment feedback manager 1130 may retransmit one or more of the downlink communication to the UE based on the physical layer feedback report.

In some cases, the downlink communication manager 1120 may transmit one or more downlink transmissions to a UE via a wireless connection with the UE. The feedback trigger manager 1135 may identify that one or more conditions associated with the wireless connection indicate that physical layer feedback is to be provided to the base station. The feedback communication manager 1125 may receive, responsive to the identifying, the physical layer feedback from the UE, where the physical layer feedback is generated by a physical layer of a protocol stack of the UE that is a lower layer than one or more higher layers of the protocol stack of the UE.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
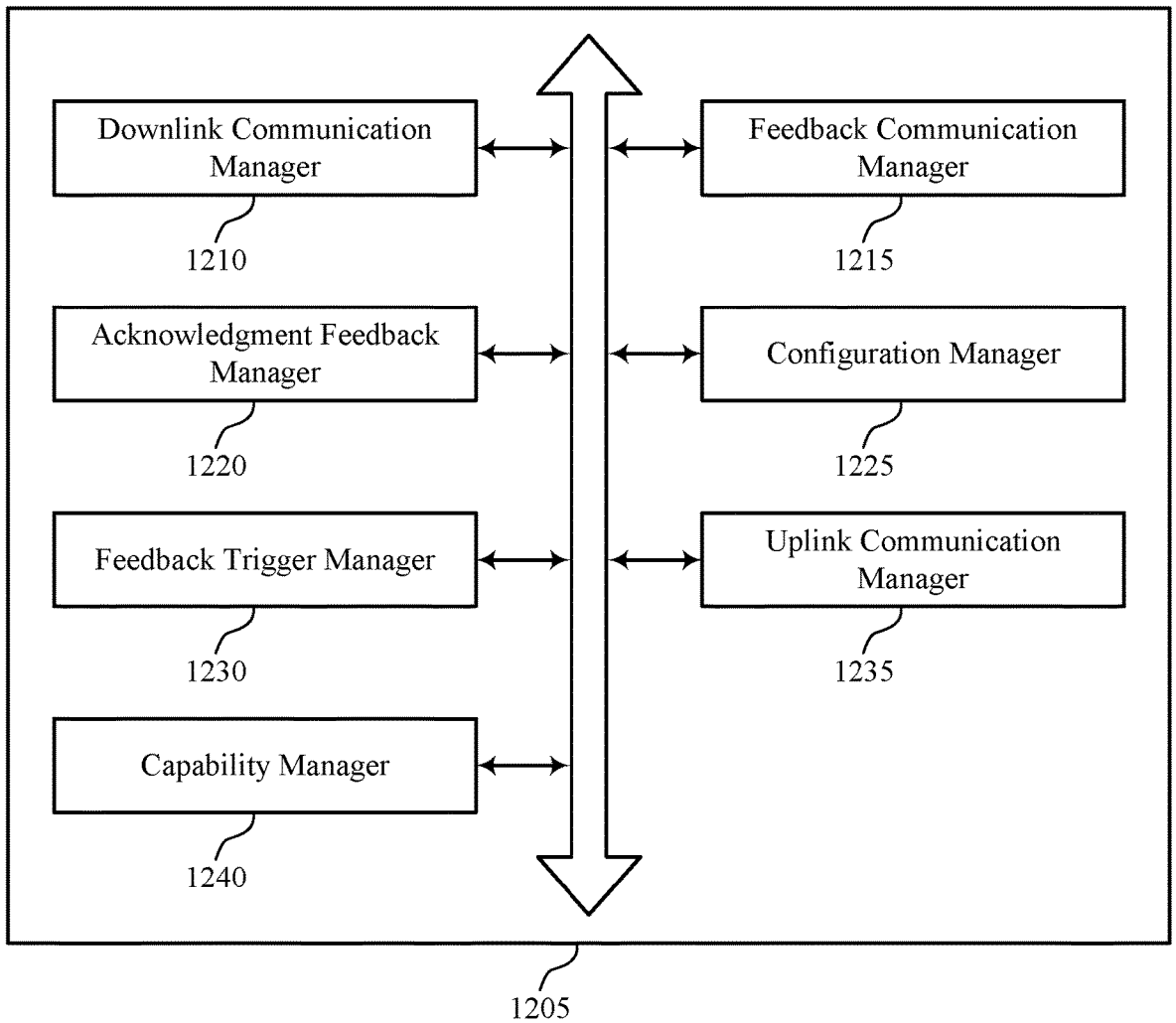
FIG. 12 shows a block diagram of a communications manager that supports acknowledgment feedback techniques in wireless communications with large propagation delays in accordance with aspects of the present disclosure.

FIG. 12 shows a block diagram 1200 of a communications manager 1205 that supports acknowledgment feedback techniques in wireless communications with large propagation delays in accordance with aspects of the present disclosure. The communications manager 1205 may be an example of aspects of a communications manager 1015, a communications manager 1115, or a communications manager 1310 described herein. The communications manager 1205 may include a downlink communication manager 1210, a feedback communication manager 1215, an acknowledgment feedback manager 1220, a configuration manager 1225, a feedback trigger manager 1230, an uplink communication manager 1235, and a capability manager 1240. Each of these modules may communicate, directly or indirectly, with one another (e.g., via one or more buses).

The downlink communication manager 1210 may transmit one or more downlink communications to a UE via a wireless connection with the UE.

The feedback communication manager 1215 may receive a physical layer feedback report in a higher layer communication from the UE, where the physical layer feedback is generated by a physical layer of a protocol stack at the UE that is a lower layer than one or more higher layers of the protocol stack. In some examples, the feedback communication manager 1215 may transmit, to the UE via higher layer signaling, one or more physical layer feedback reports associated with the one or more uplink communications. In some cases, the higher layer communication from the UE is a MAC layer communication that includes a MAC-CE that indicates feedback for one or more physical layer acknowledgment feedback processes of the UE. In some cases, the MAC-CE includes a reserved logical channel identification (LCID) or a new extended LCID that is associated with acknowledgment feedback for the UE.

In some cases, the higher layer communication includes one or more fixed size data or information transmissions for reporting a predetermined number of physical layer feedback processes of the UE. In some cases, the higher layer communication includes a channel quality report associated with a number of feedback processes having a negative acknowledgment feedback status. In some cases, the higher layer communication includes one or more variable sized data or information transmissions that each provide an identification of one or more feedback processes at the UE. In some cases, the higher layer communication further includes one or more of a feedback process identification and a number of times that data associated with the feedback process identification was attempted to be decoded at the UE.

In some cases, a first MAC-CE format is configured at the UE for transmission of the physical layer feedback report for the one or more downlink transmissions, and a second MAC-CE format is configured at the UE for reception of the one or more physical layer feedback reports associated with the one or more uplink communications.

The acknowledgment feedback manager 1220 may retransmit one or more of the downlink communication to the UE based on the physical layer feedback report. In some examples, the acknowledgment feedback manager 1220 may determine physical layer feedback associated with the one or more uplink communications. In some examples, the acknowledgment feedback manager 1220 may transmit, responsive to a failure to decode the physical layer acknowledgment feedback report in the higher layer communication, a resource grant for retransmission of the physical layer feedback. In some examples, the acknowledgment feedback manager 1220 may monitor for a retransmission of the physical layer feedback report in the one or more higher layer communications based on the resource grant.

The feedback trigger manager 1230 may identify that one or more conditions associated with the wireless connection indicate that physical layer feedback is to be provided to the base station. In some examples, the feedback trigger manager 1230 may configure the UE to transmit the physical layer feedback report in the higher layer communication based on one or more of a request to the UE to transmit the physical layer feedback, a physical layer indication that one or more of the downlink transmissions were unsuccessfully decoded, a physical layer indication that decoding failed for one or more feedback process identifications, or that a number of unsuccessful decoding attempts of one or more of the downlink transmissions exceeds a threshold value, a number of feedback processes for which decoding of an associated downlink transmission is unsuccessful exceeds a threshold number, a synchronization error at the physical layer of the UE, an expiration of a timer associated with physical layer synchronization, a timing associated with a periodic physical layer feedback report, or any combinations thereof.

The configuration manager 1225 may transmit, to the UE, configuration information that disables physical layer reports of feedback and that enables the higher layer communications for transmission of the physical layer feedback report. In some examples, the configuration manager 1225 may disable physical layer reports of the physical layer feedback prior to the transmitting the one or more downlink transmissions to the UE. In some examples, the configuration manager 1225 may configure the UE with the timing for periodic physical layer feedback reports based on a propagation delay between the UE and the base station. In some cases, the signaling that indicates the higher layer communication is to be used for physical layer feedback is transmitted in broadcast information from the base station, in RRC signaling from the base station, or combinations thereof.

The uplink communication manager 1235 may receive one or more uplink communications from the UE. The capability manager 1240 may receive, from the UE, a capability message that indicates the UE is capable to communicate physical layer feedback in one or more higher layer communications with the base station.

Figure 13:
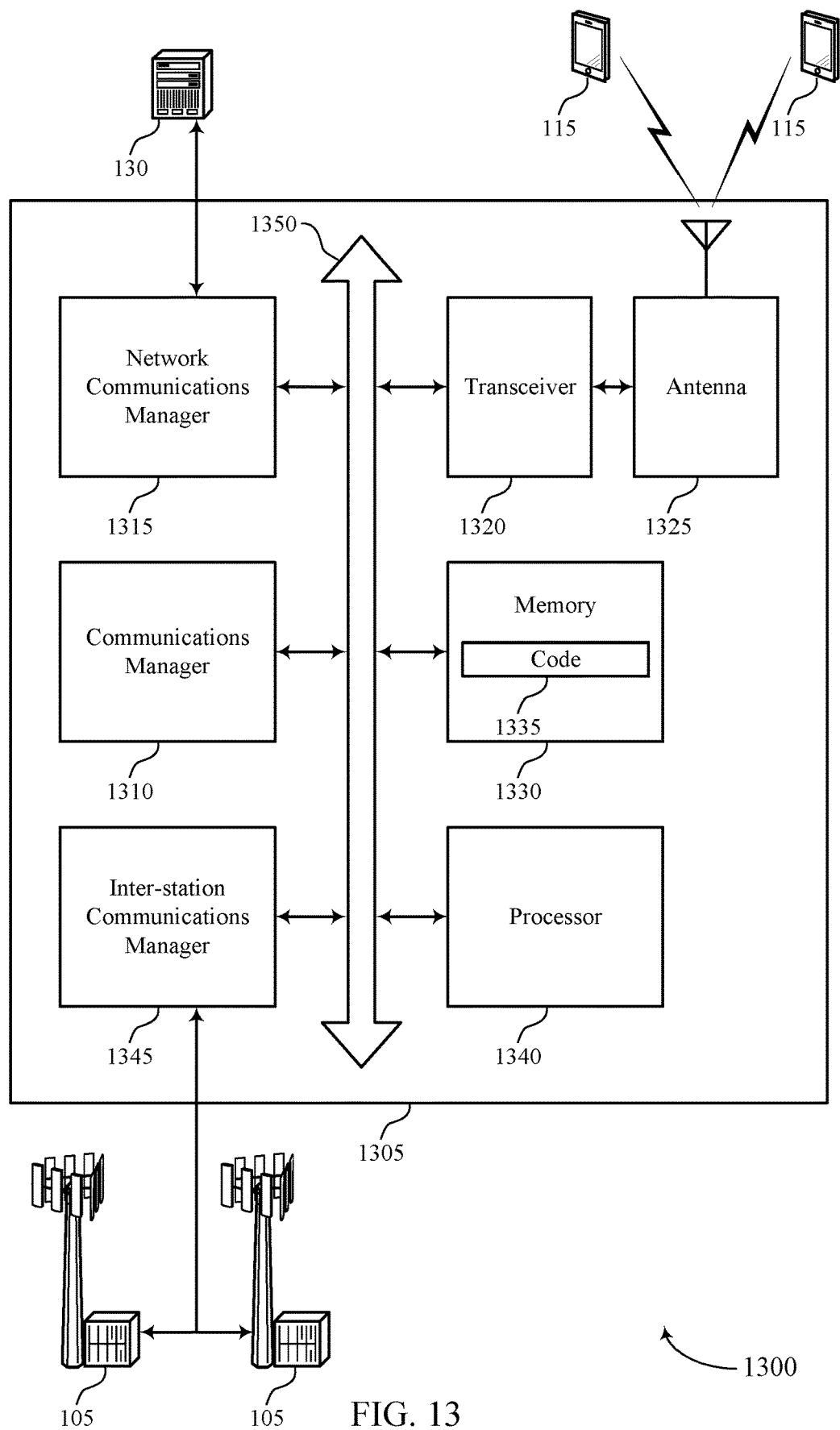
FIG. 13 shows a diagram of a system including a device that supports acknowledgment feedback techniques in wireless communications with large propagation delays in accordance with aspects of the present disclosure.

FIG. 13 shows a diagram of a system 1300 including a device 1305 that supports acknowledgment feedback techniques in wireless communications with large propagation delays in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit one or more downlink communications to a UE via a wireless connection with the UE, receive a physical layer feedback report in a higher layer communication from the UE, where the physical layer feedback is generated by a physical layer of a protocol stack at the UE that is a lower layer than one or more higher layers of the protocol stack, and retransmit one or more of the downlink communication to the UE based on the physical layer feedback report.

The communications manager 1310 may also transmit one or more downlink transmissions to a UE via a wireless connection with the UE, identify that one or more conditions associated with the wireless connection indicate that physical layer feedback is to be provided to the base station, and receive, responsive to the identifying, the physical layer feedback from the UE, where the physical layer feedback is generated by a physical layer of a protocol stack of the UE that is a lower layer than one or more higher layers of the protocol stack of the UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting acknowledgment feedback techniques in wireless communications with large propagation delays).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
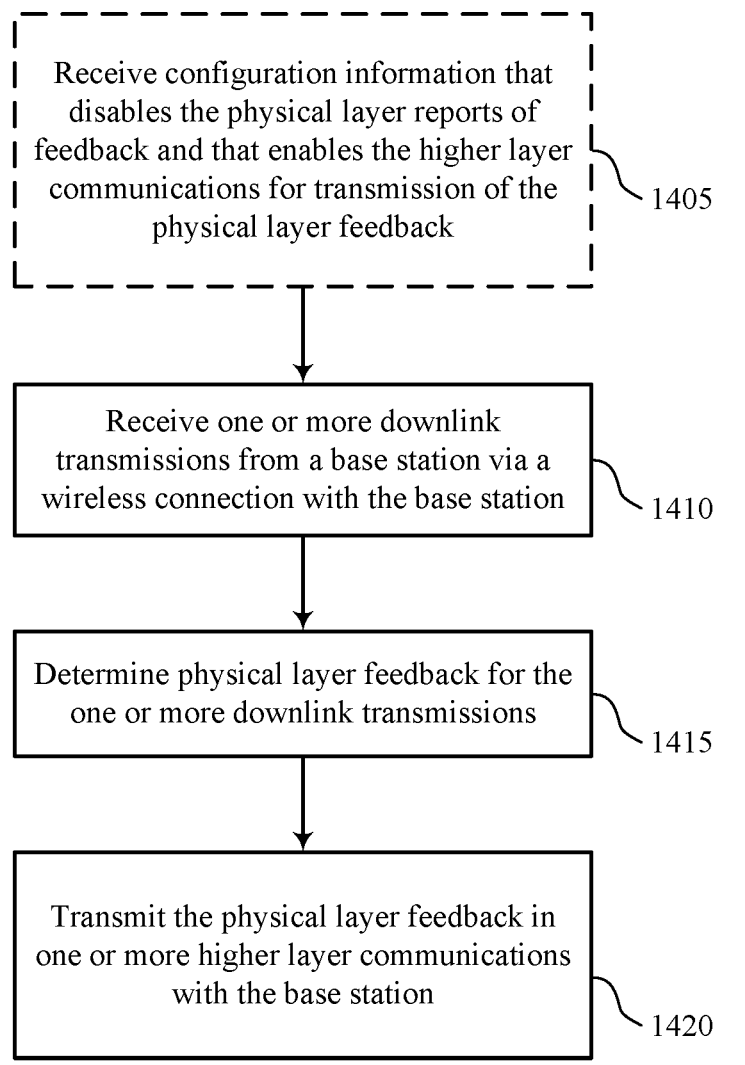
FIGS. 14 through 23 show flowcharts illustrating methods that support acknowledgment feedback techniques in wireless communications with large propagation delays in accordance with aspects of the present disclosure.

FIG. 14 shows a flowchart illustrating a method 1400 that supports acknowledgment feedback techniques in wireless communications with large propagation delays in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

Optionally, at 1405, the UE may receive configuration information that disables physical layer feedback reports and that enables the higher layer communications for transmission of the physical layer feedback. The operations of 1405 may be performed according to the methods described herein. In some examples, aspects of the operations of 1405 may be performed by a configuration manager as described with reference to FIGS. 6 through 9.

At 1410, the UE may receive one or more downlink transmissions from a base station via a wireless connection with the base station. The operations of 1410 may be performed according to the methods described herein. In some examples, aspects of the operations of 1410 may be performed by a downlink communication manager as described with reference to FIGS. 6 through 9.

At 1415, the UE may determine physical layer feedback for the one or more downlink transmissions. The operations of 1415 may be performed according to the methods described herein. In some examples, aspects of the operations of 1415 may be performed by an acknowledgment feedback manager as described with reference to FIGS. 6 through 9.

At 1420, the UE may transmit the physical layer feedback in one or more higher layer communications with the base station. In some cases, the physical layer feedback is determined at a physical layer of a protocol stack at the UE that is a lower layer than one or more higher layers used to transmit the higher layer communications. The operations of 1420 may be performed according to the methods described herein. In some examples, aspects of the operations of 1420 may be performed by a feedback communication manager as described with reference to FIGS. 6 through 9.

Figure 15:
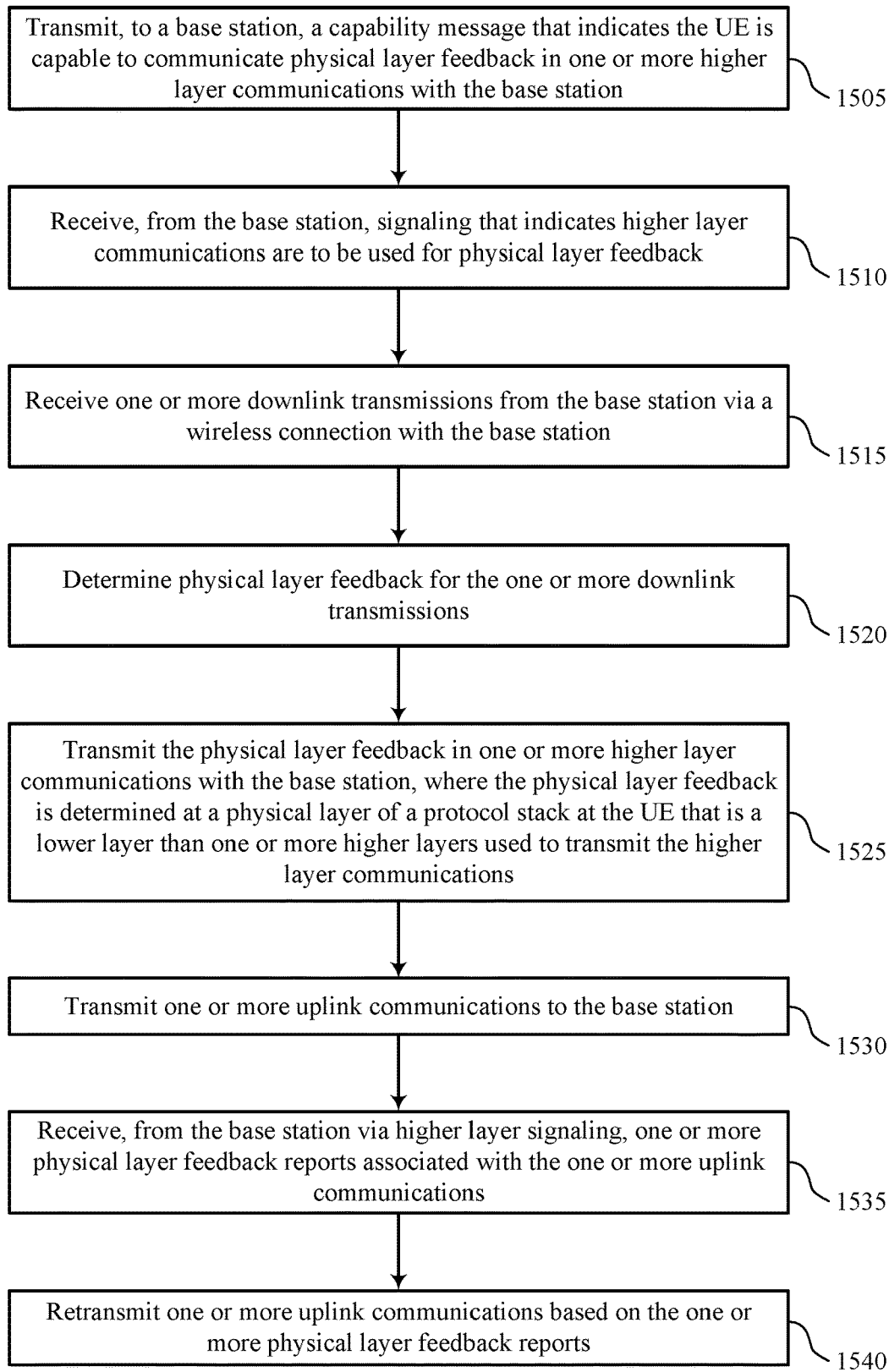

FIG. 15 shows a flowchart illustrating a method 1500 that supports acknowledgment feedback techniques in wireless communications with large propagation delays in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may transmit, to a base station, a capability message that indicates the UE is capable to communicate physical layer feedback in one or more higher layer communications with the base station. The operations of 1505 may be performed according to the methods described herein. In some examples, aspects of the operations of 1505 may be performed by a capability manager as described with reference to FIGS. 6 through 9.

At 1510, the UE may receive, from the base station, signaling that indicates higher layer communications are to be used for physical layer feedback. The operations of 1510 may be performed according to the methods described herein. In some examples, aspects of the operations of 1510 may be performed by a configuration manager as described with reference to FIGS. 6 through 9.

At 1515, the UE may receive one or more downlink transmissions from the base station via a wireless connection with the base station. The operations of 1515 may be performed according to the methods described herein. In some examples, aspects of the operations of 1515 may be performed by a downlink communication manager as described with reference to FIGS. 6 through 9.

At 1520, the UE may determine physical layer feedback for the one or more downlink transmissions. The operations of 1520 may be performed according to the methods described herein. In some examples, aspects of the operations of 1520 may be performed by an acknowledgment feedback manager as described with reference to FIGS. 6 through 9.

At 1525, the UE may transmit the physical layer feedback in one or more higher layer communications with the base station, where the physical layer feedback is determined at a physical layer of a protocol stack at the UE that is a lower layer than one or more higher layers used to transmit the higher layer communications. The operations of 1525 may be performed according to the methods described herein. In some examples, aspects of the operations of 1525 may be performed by a feedback communication manager as described with reference to FIGS. 6 through 9.

At 1530, the UE may transmit one or more uplink communications to the base station. The operations of 1530 may be performed according to the methods described herein. In some examples, aspects of the operations of 1530 may be performed by an uplink communication manager as described with reference to FIGS. 6 through 9.

At 1535, the UE may receive, from the base station via higher layer signaling, one or more physical layer feedback reports associated with the one or more uplink communications. The operations of 1535 may be performed according to the methods described herein. In some examples, aspects of the operations of 1535 may be performed by an acknowledgment feedback manager as described with reference to FIGS. 6 through 9.

At 1540, the UE may retransmit one or more uplink communications based on the one or more physical layer feedback reports. The operations of 1540 may be performed according to the methods described herein. In some examples, aspects of the operations of 1540 may be performed by an acknowledgment feedback manager as described with reference to FIGS. 6 through 9.

Figure 16:
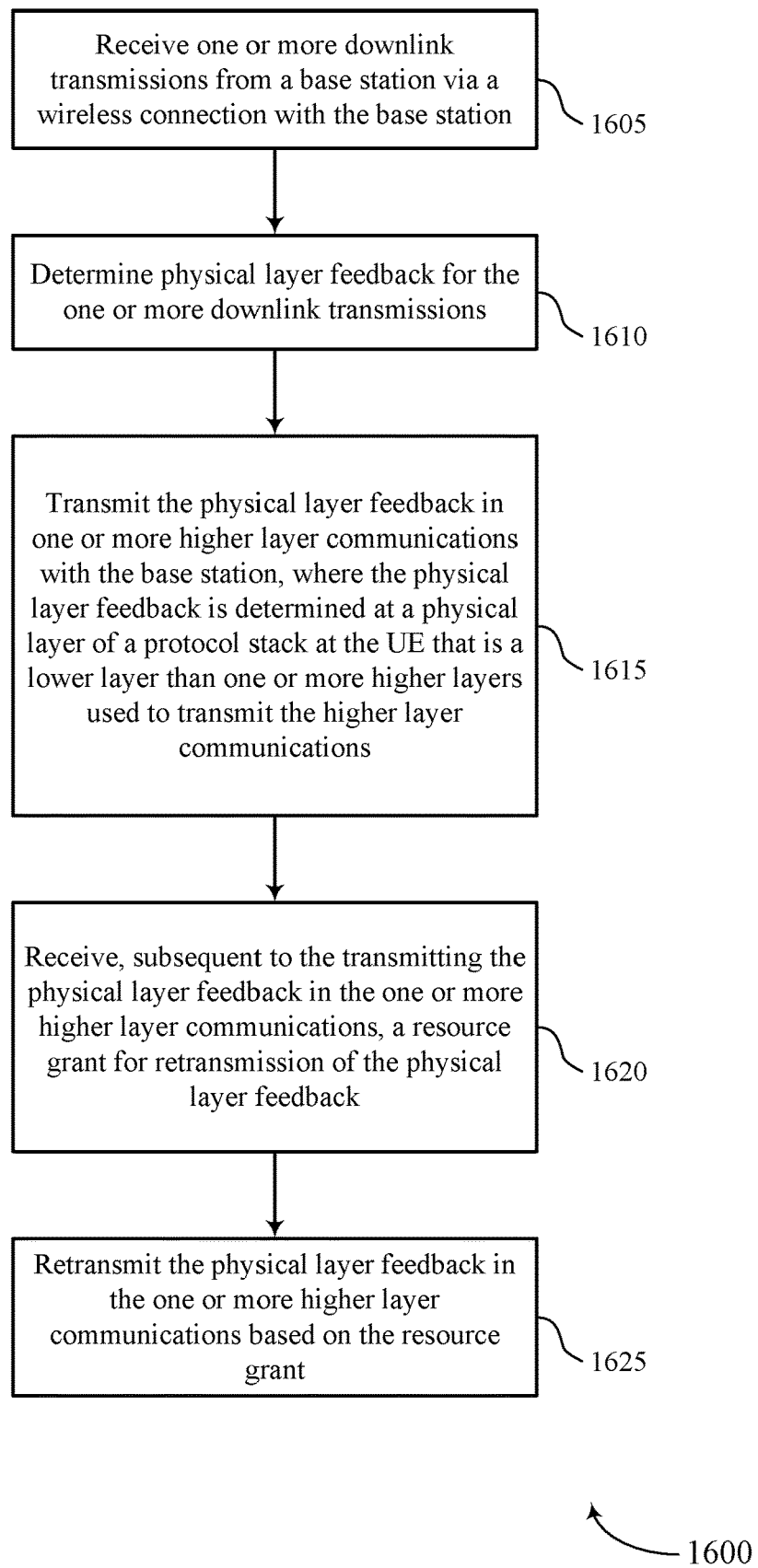

FIG. 16 shows a flowchart illustrating a method 1600 that supports acknowledgment feedback techniques in wireless communications with large propagation delays in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive one or more downlink transmissions from a base station via a wireless connection with the base station. The operations of 1605 may be performed according to the methods described herein. In some examples, aspects of the operations of 1605 may be performed by a downlink communication manager as described with reference to FIGS. 6 through 9.

At 1610, the UE may determine physical layer feedback for the one or more downlink transmissions. The operations of 1610 may be performed according to the methods described herein. In some examples, aspects of the operations of 1610 may be performed by an acknowledgment feedback manager as described with reference to FIGS. 6 through 9.

At 1615, the UE may transmit the physical layer feedback in one or more higher layer communications with the base station, where the physical layer feedback is determined at a physical layer of a protocol stack at the UE that is a lower layer than one or more higher layers used to transmit the higher layer communications. The operations of 1615 may be performed according to the methods described herein. In some examples, aspects of the operations of 1615 may be performed by a feedback communication manager as described with reference to FIGS. 6 through 9.

At 1620, the UE may receive, subsequent to the transmitting the physical layer feedback in the one or more higher layer communications, a resource grant for retransmission of the physical layer feedback. The operations of 1620 may be performed according to the methods described herein. In some examples, aspects of the operations of 1620 may be performed by a feedback communication manager as described with reference to FIGS. 6 through 9.

At 1625, the UE may retransmit the physical layer feedback in the one or more higher layer communications based on the resource grant. The operations of 1625 may be performed according to the methods described herein. In some examples, aspects of the operations of 1625 may be performed by a feedback communication manager as described with reference to FIGS. 6 through 9.

Figure 17:
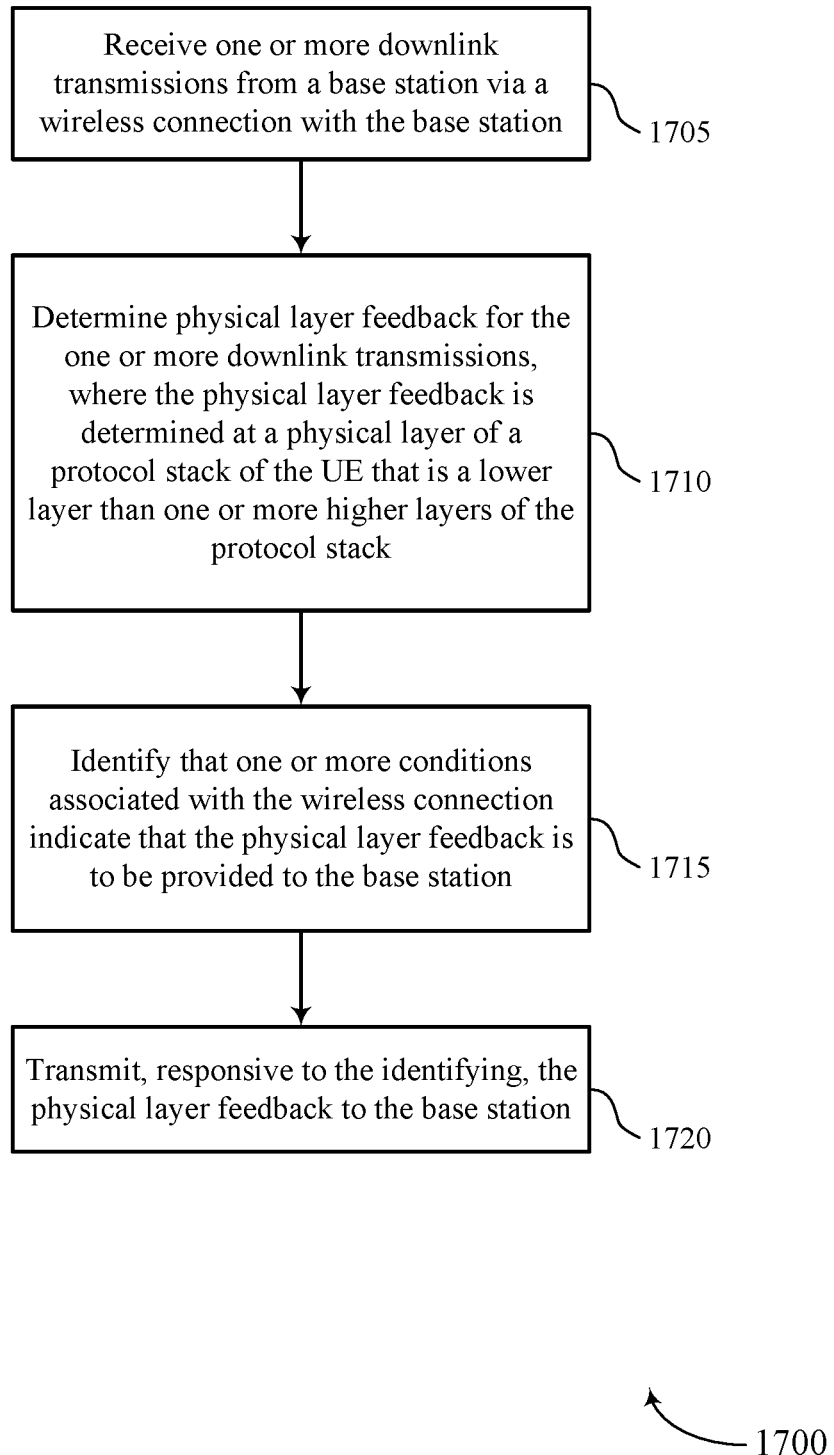

FIG. 17 shows a flowchart illustrating a method 1700 that supports acknowledgment feedback techniques in wireless communications with large propagation delays in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive one or more downlink transmissions from a base station via a wireless connection with the base station. The operations of 1705 may be performed according to the methods described herein. In some examples, aspects of the operations of 1705 may be performed by a downlink communication manager as described with reference to FIGS. 6 through 9.

At 1710, the UE may determine physical layer feedback for the one or more downlink transmissions, where the physical layer feedback is determined at a physical layer of a protocol stack of the UE that is a lower layer than one or more higher layers of the protocol stack. The operations of 1710 may be performed according to the methods described herein. In some examples, aspects of the operations of 1710 may be performed by an acknowledgment feedback manager as described with reference to FIGS. 6 through 9.

At 1715, the UE may identify that one or more conditions associated with the wireless connection indicate that the physical layer feedback is to be provided to the base station. The operations of 1715 may be performed according to the methods described herein. In some examples, aspects of the operations of 1715 may be performed by a feedback trigger manager as described with reference to FIGS. 6 through 9.

At 1720, the UE may transmit, responsive to the identifying, the physical layer feedback to the base station. The operations of 1720 may be performed according to the methods described herein. In some examples, aspects of the operations of 1720 may be performed by a feedback communication manager as described with reference to FIGS. 6 through 9.

Figure 18:
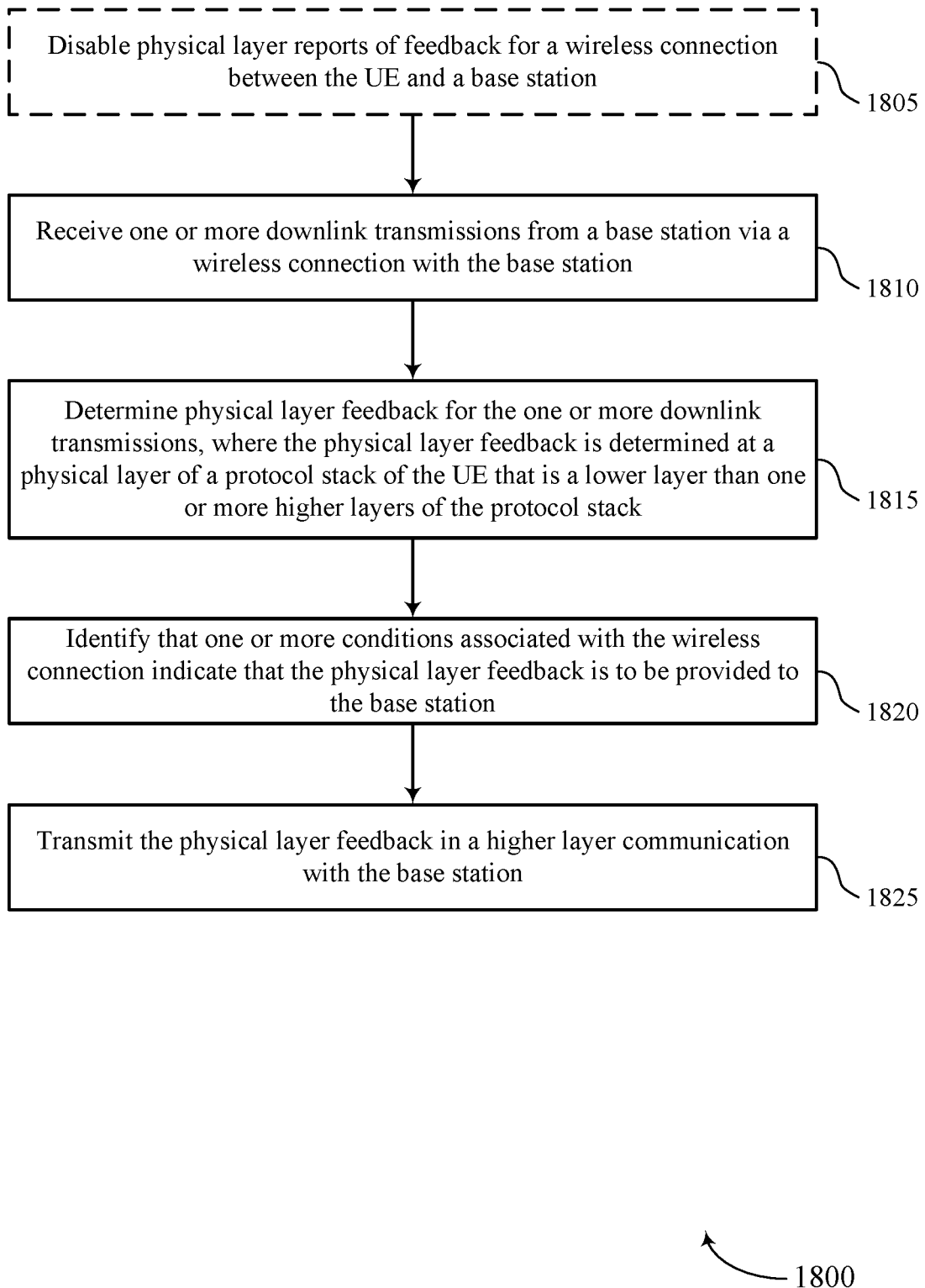

FIG. 18 shows a flowchart illustrating a method 1800 that supports acknowledgment feedback techniques in wireless communications with large propagation delays in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

Optionally, at 1805, the UE may disable, prior to receiving one or more downlink transmissions, physical layer reports of feedback for a wireless connection between the UE and a base station. The operations of 1805 may be performed according to the methods described herein. In some examples, aspects of the operations of 1805 may be performed by a configuration manager as described with reference to FIGS. 6 through 9.

At 1810, the UE may receive one or more downlink transmissions from a base station via a wireless connection with the base station. The operations of 1810 may be performed according to the methods described herein. In some examples, aspects of the operations of 1810 may be performed by a downlink communication manager as described with reference to FIGS. 6 through 9.

At 1815, the UE may determine physical layer feedback for the one or more downlink transmissions, where the physical layer feedback is determined at a physical layer of a protocol stack of the UE that is a lower layer than one or more higher layers of the protocol stack. The operations of 1815 may be performed according to the methods described herein. In some examples, aspects of the operations of 1815 may be performed by an acknowledgment feedback manager as described with reference to FIGS. 6 through 9.

At 1820, the UE may identify that one or more conditions associated with the wireless connection indicate that the physical layer feedback is to be provided to the base station. The operations of 1820 may be performed according to the methods described herein. In some examples, aspects of the operations of 1820 may be performed by a feedback trigger manager as described with reference to FIGS. 6 through 9.

At 1825, the UE may transmit the physical layer feedback in a higher layer communication with the base station. The operations of 1825 may be performed according to the methods described herein. In some examples, aspects of the operations of 1825 may be performed by a feedback communication manager as described with reference to FIGS. 6 through 9.

Figure 19:
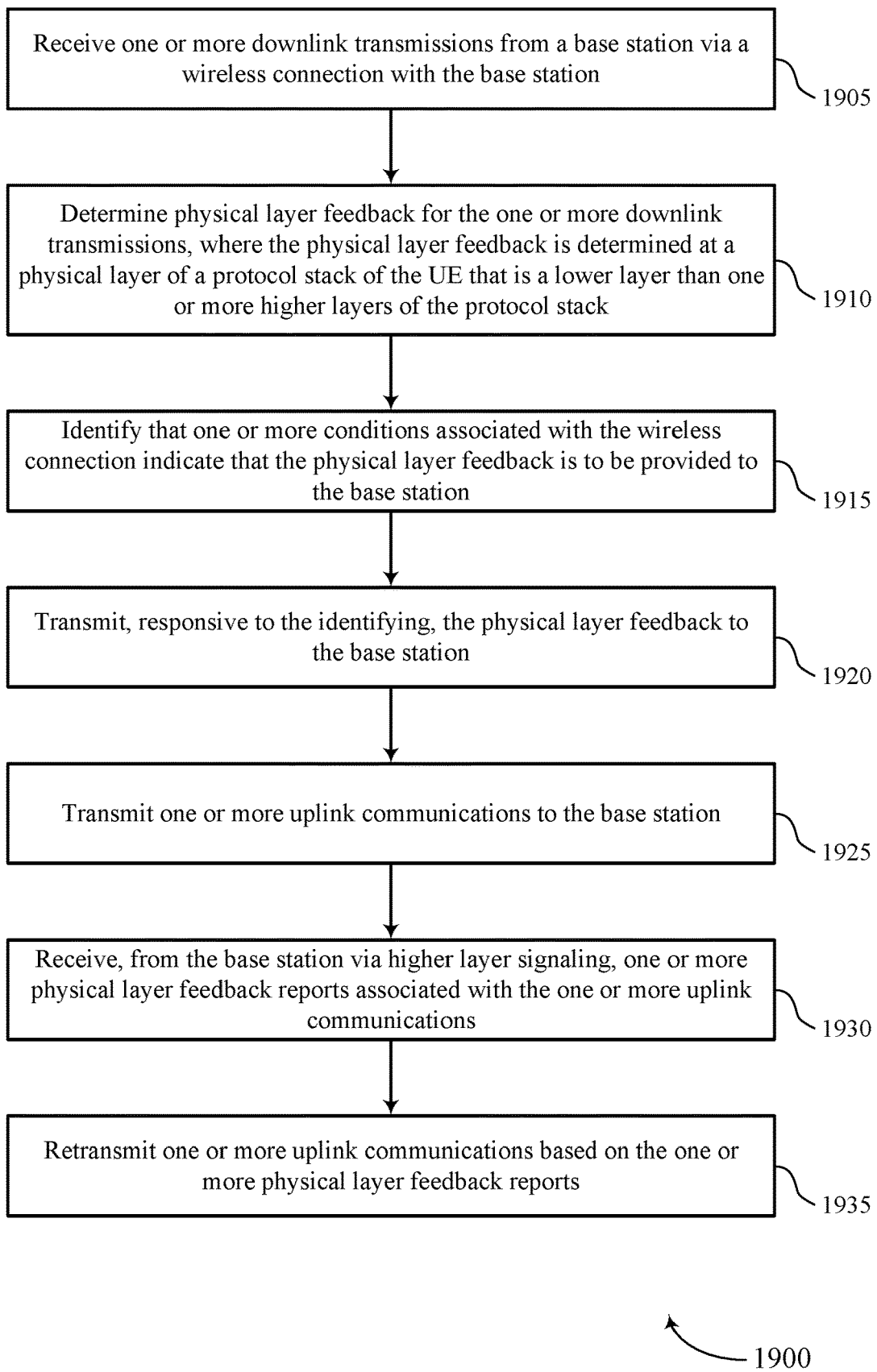

FIG. 19 shows a flowchart illustrating a method 1900 that supports acknowledgment feedback techniques in wireless communications with large propagation delays in accordance with aspects of the present disclosure. The operations of method 1900 may be implemented by a UE 115 or its components as described herein. For example, the operations of method 1900 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1905, the UE may receive one or more downlink transmissions from a base station via a wireless connection with the base station. The operations of 1905 may be performed according to the methods described herein. In some examples, aspects of the operations of 1905 may be performed by a downlink communication manager as described with reference to FIGS. 6 through 9.

At 1910, the UE may determine physical layer feedback for the one or more downlink transmissions, where the physical layer feedback is determined at a physical layer of a protocol stack of the UE that is a lower layer than one or more higher layers of the protocol stack. The operations of 1910 may be performed according to the methods described herein. In some examples, aspects of the operations of 1910 may be performed by an acknowledgment feedback manager as described with reference to FIGS. 6 through 9.

At 1915, the UE may identify that one or more conditions associated with the wireless connection indicate that the physical layer feedback is to be provided to the base station. The operations of 1915 may be performed according to the methods described herein. In some examples, aspects of the operations of 1915 may be performed by a feedback trigger manager as described with reference to FIGS. 6 through 9.

At 1920, the UE may transmit, responsive to the identifying, the physical layer feedback to the base station. The operations of 1920 may be performed according to the methods described herein. In some examples, aspects of the operations of 1920 may be performed by a feedback communication manager as described with reference to FIGS. 6 through 9.

At 1925, the UE may transmit one or more uplink communications to the base station. The operations of 1925 may be performed according to the methods described herein.

In some examples, aspects of the operations of 1925 may be performed by an uplink communication manager as described with reference to FIGS. 6 through 9.

At 1930, the UE may receive, from the base station via higher layer signaling, one or more physical layer feedback reports associated with the one or more uplink communications. The operations of 1930 may be performed according to the methods described herein. In some examples, aspects of the operations of 1930 may be performed by an acknowledgment feedback manager as described with reference to FIGS. 6 through 9.

At 1935, the UE may retransmit one or more uplink communications based on the one or more physical layer feedback reports. The operations of 1935 may be performed according to the methods described herein. In some examples, aspects of the operations of 1935 may be performed by an acknowledgment feedback manager as described with reference to FIGS. 6 through 9.

Figure 20:
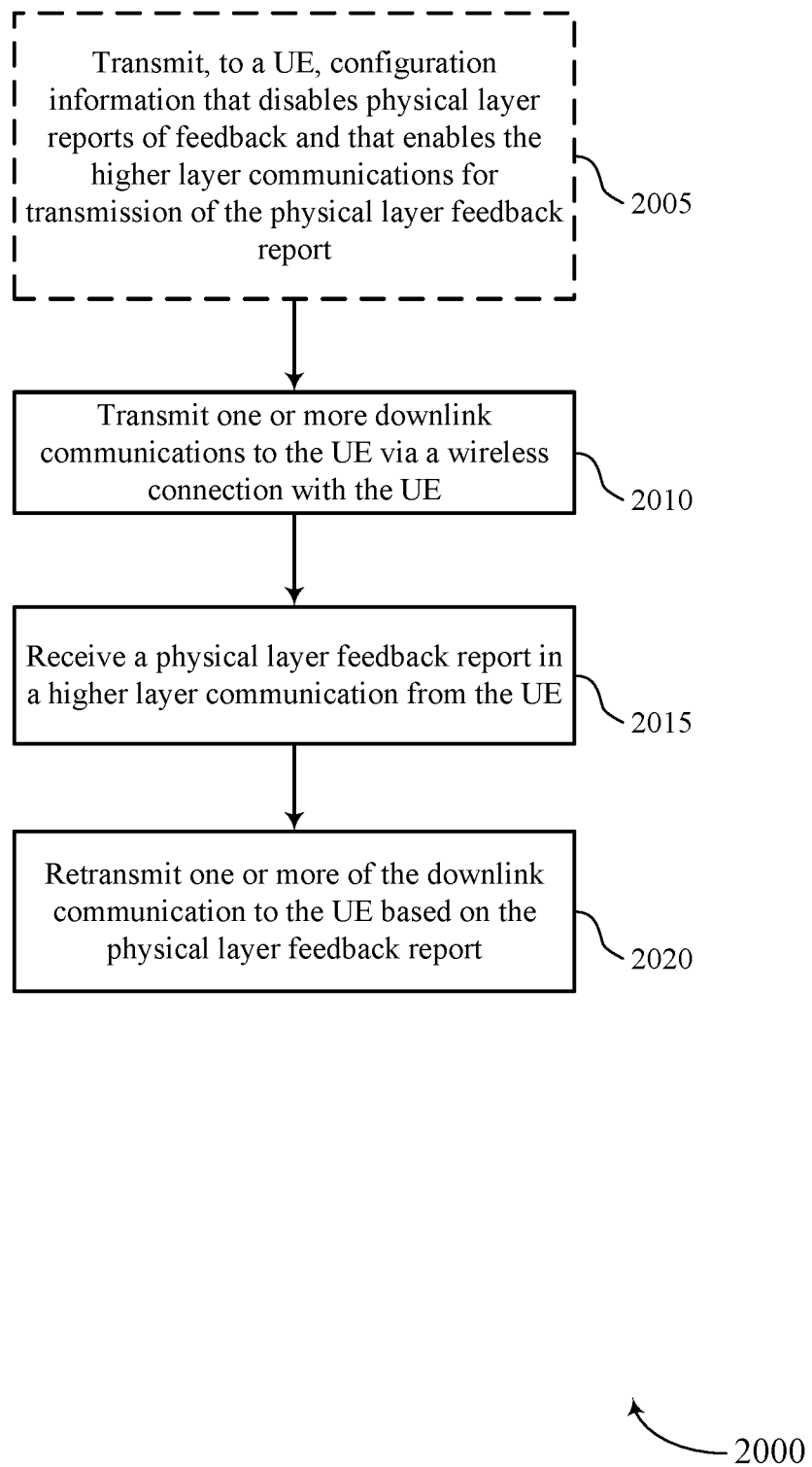

FIG. 20 shows a flowchart illustrating a method 2000 that supports acknowledgment feedback techniques in wireless communications with large propagation delays in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

Optionally, at 2005, the base station may transmit, to a UE, configuration information that disables physical layer reports of feedback and that enables the higher layer communications for transmission of the physical layer feedback report. The operations of 2005 may be performed according to the methods described herein. In some examples, aspects of the operations of 2005 may be performed by a configuration manager as described with reference to FIGS. 10 through 13.

At 2010, the base station may transmit one or more downlink communications to a UE via a wireless connection with the UE. The operations of 2010 may be performed according to the methods described herein. In some examples, aspects of the operations of 2010 may be performed by a downlink communication manager as described with reference to FIGS. 10 through 13.

At 2015, the base station may receive a physical layer feedback report in a higher layer communication from the UE. In some cases, the physical layer feedback is generated by a physical layer of a protocol stack at the UE that is a lower layer than one or more higher layers of the protocol stack. The operations of 2015 may be performed according to the methods described herein. In some examples, aspects of the operations of 2015 may be performed by a feedback communication manager as described with reference to FIGS. 10 through 13.

At 2020, the base station may retransmit one or more of the downlink communication to the UE based on the physical layer feedback report. The operations of 2020 may be performed according to the methods described herein. In some examples, aspects of the operations of 2020 may be performed by an acknowledgment feedback manager as described with reference to FIGS. 10 through 13.

Figure 21:
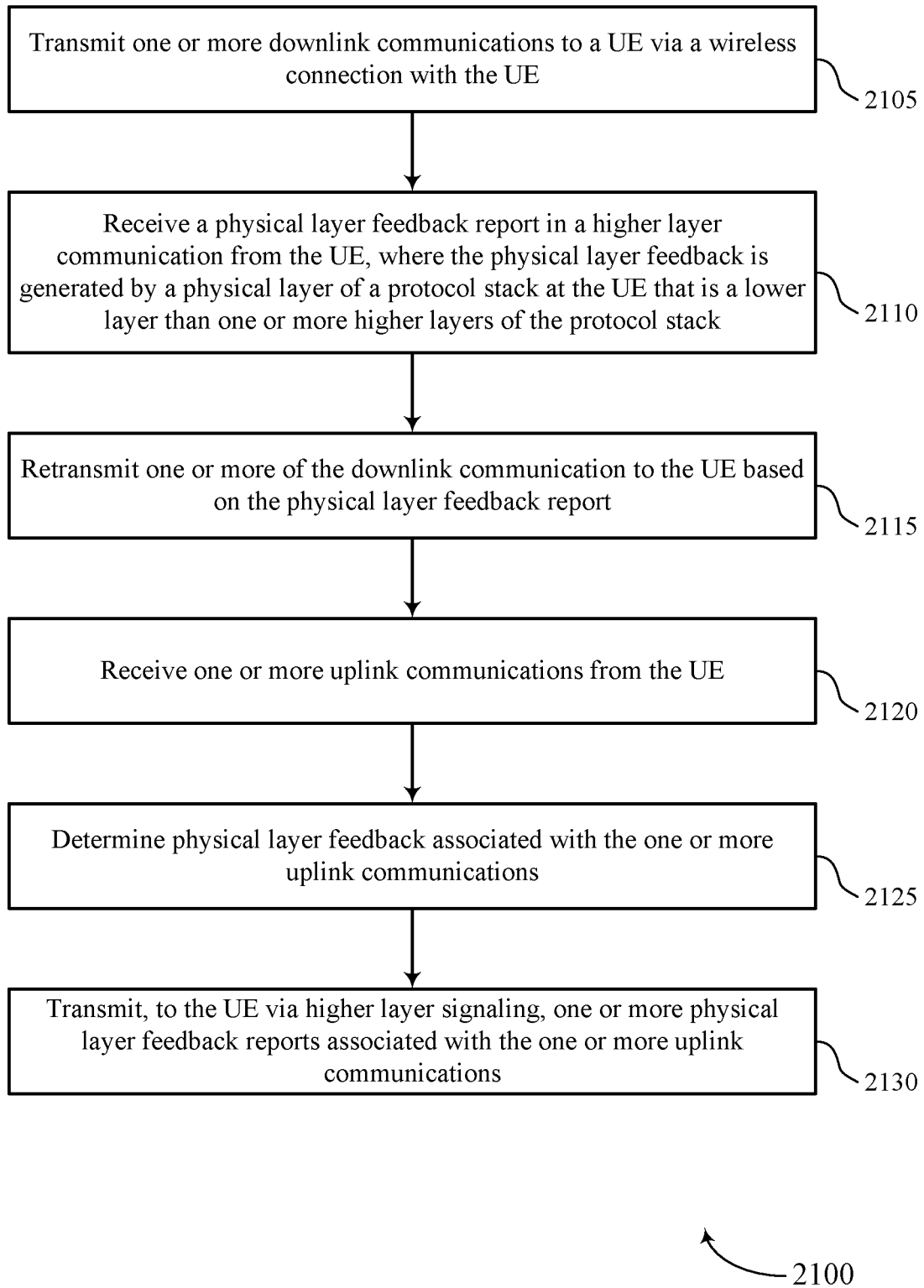

FIG. 21 shows a flowchart illustrating a method 2100 that supports acknowledgment feedback techniques in wireless communications with large propagation delays in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2105, the base station may transmit one or more downlink communications to a UE via a wireless connection with the UE. The operations of 2105 may be performed according to the methods described herein. In some examples, aspects of the operations of 2105 may be performed by a downlink communication manager as described with reference to FIGS. 10 through 13.

At 2110, the base station may receive a physical layer feedback report in a higher layer communication from the UE, where the physical layer feedback is generated by a physical layer of a protocol stack at the UE that is a lower layer than one or more higher layers of the protocol stack. The operations of 2110 may be performed according to the methods described herein. In some examples, aspects of the operations of 2110 may be performed by a feedback communication manager as described with reference to FIGS. 10 through 13.

At 2115, the base station may retransmit one or more of the downlink communication to the UE based on the physical layer feedback report. The operations of 2115 may be performed according to the methods described herein. In some examples, aspects of the operations of 2115 may be performed by an acknowledgment feedback manager as described with reference to FIGS. 10 through 13.

At 2120, the base station may receive one or more uplink communications from the UE. The operations of 2120 may be performed according to the methods described herein. In some examples, aspects of the operations of 2120 may be performed by an uplink communication manager as described with reference to FIGS. 10 through 13.

At 2125, the base station may determine physical layer feedback associated with the one or more uplink communications. The operations of 2125 may be performed according to the methods described herein. In some examples, aspects of the operations of 2125 may be performed by an acknowledgment feedback manager as described with reference to FIGS. 10 through 13.

At 2130, the base station may transmit, to the UE via higher layer signaling, one or more physical layer feedback reports associated with the one or more uplink communications. The operations of 2130 may be performed according to the methods described herein. In some examples, aspects of the operations of 2130 may be performed by a feedback communication manager as described with reference to FIGS. 10 through 13.

Figure 22:
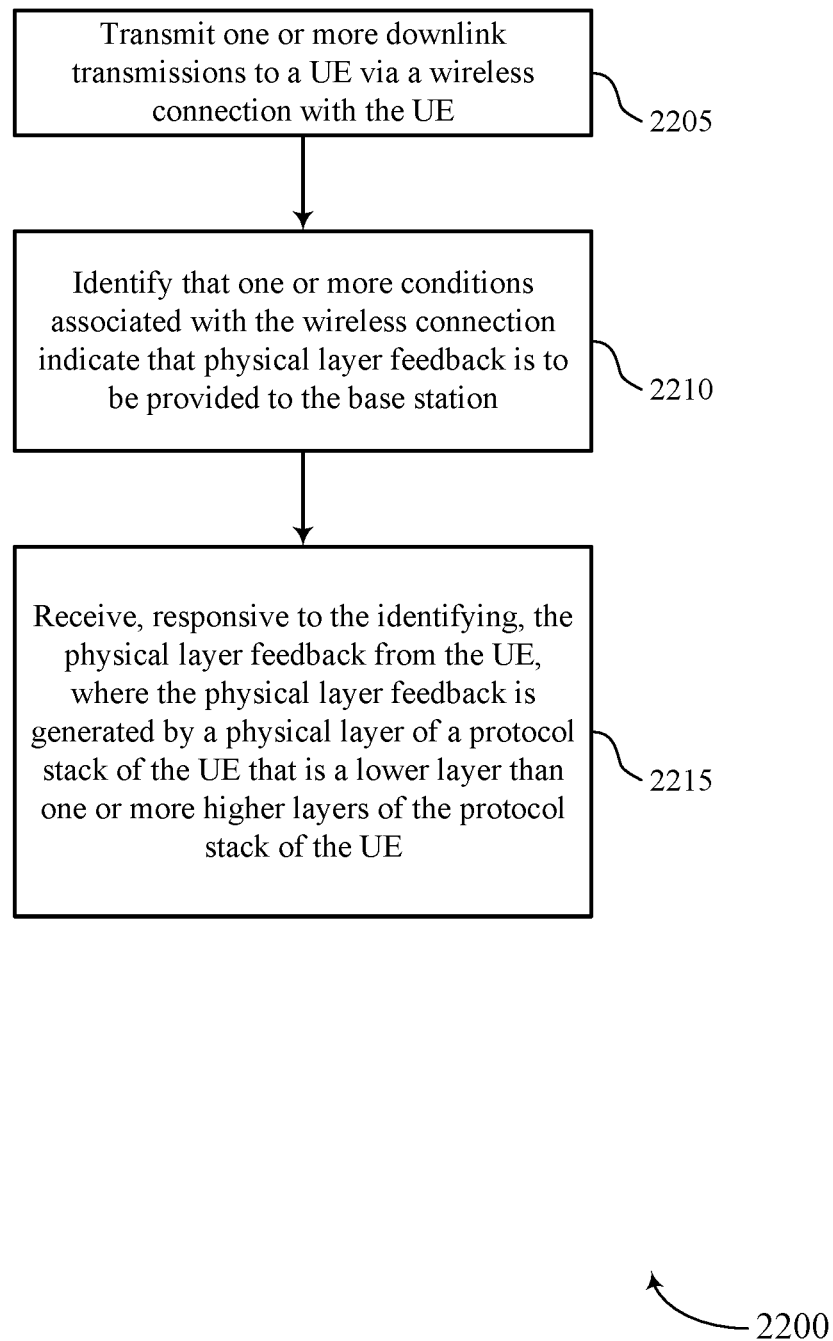

FIG. 22 shows a flowchart illustrating a method 2200 that supports acknowledgment feedback techniques in wireless communications with large propagation delays in accordance with aspects of the present disclosure. The operations of method 2200 may be implemented by a base station 105 or its components as described herein. For example, the operations of method 2200 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2205, the base station may transmit one or more downlink transmissions to a UE via a wireless connection with the UE. The operations of 2205 may be performed according to the methods described herein. In some examples, aspects of the operations of 2205 may be performed by a downlink communication manager as described with reference to FIGS. 10 through 13.

At 2210, the base station may identify that one or more conditions associated with the wireless connection indicate that physical layer feedback is to be provided to the base station. The operations of 2210 may be performed according to the methods described herein. In some examples, aspects of the operations of 2210 may be performed by a feedback trigger manager as described with reference to FIGS. 10 through 13.

At 2215, the base station may receive, responsive to the identifying, the physical layer feedback from the UE, where the physical layer feedback is generated by a physical layer of a protocol stack of the UE that is a lower layer than one or more higher layers of the protocol stack of the UE. The operations of 2215 may be performed according to the methods described herein. In some examples, aspects of the operations of 2215 may be performed by a feedback communication manager as described with reference to FIGS. 10 through 13.

Figure 23:
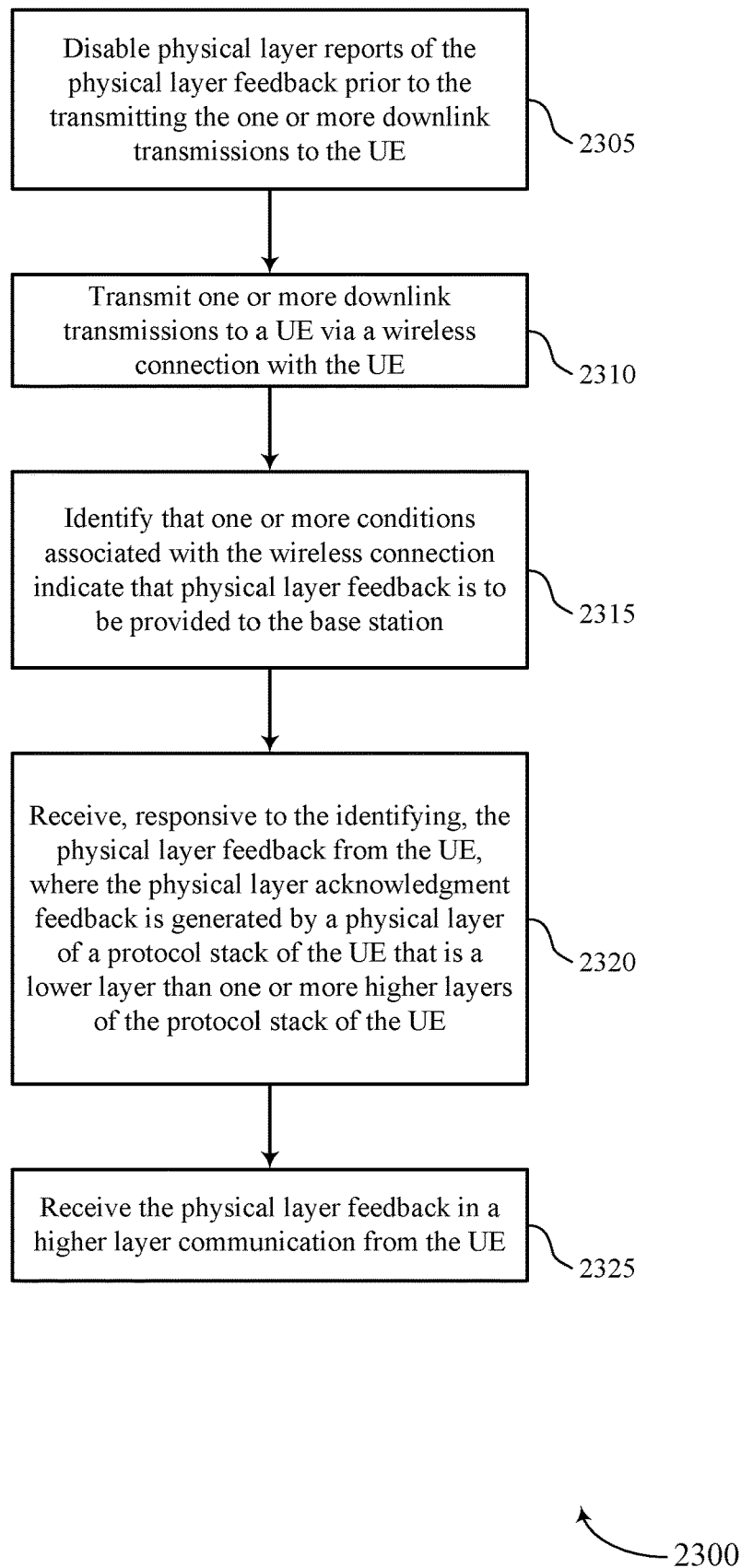

FIG. 23 shows a flowchart illustrating a method 2300 that supports acknowledgment feedback techniques in wireless communications with large propagation delays in accordance with aspects of the present disclosure. The operations of method 2300 may be implemented by a base station 105 or its components as described herein. For example, the operations of method 2300 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2305, the base station may disable physical layer reports of the physical layer feedback prior to the transmitting the one or more downlink transmissions to the UE. The operations of 2305 may be performed according to the methods described herein. In some examples, aspects of the operations of 2305 may be performed by a configuration manager as described with reference to FIGS. 10 through 13.

At 2310, the base station may transmit one or more downlink transmissions to a UE via a wireless connection with the UE. The operations of 2310 may be performed according to the methods described herein. In some examples, aspects of the operations of 2310 may be performed by a downlink communication manager as described with reference to FIGS. 10 through 13.

At 2315, the base station may identify that one or more conditions associated with the wireless connection indicate that physical layer feedback is to be provided to the base station. The operations of 2315 may be performed according to the methods described herein. In some examples, aspects of the operations of 2315 may be performed by a feedback trigger manager as described with reference to FIGS. 10 through 13.

At 2320, the base station may receive, responsive to the identifying, the physical layer feedback from the UE, where the physical layer feedback is generated by a physical layer of a protocol stack of the UE that is a lower layer than one or more higher layers of the protocol stack of the UE. The operations of 2320 may be performed according to the methods described herein. In some examples, aspects of the operations of 2320 may be performed by a feedback communication manager as described with reference to FIGS. 10 through 13.

At 2325, the base station may receive the physical layer feedback in a higher layer communication from the UE. The operations of 2325 may be performed according to the methods described herein. In some examples, aspects of the operations of 2325 may be performed by a feedback communication manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving one or more downlink transmissions from a base station via a wireless connection with the base station; determining physical layer feedback for the one or more downlink transmissions, the physical layer feedback associated with a physical layer of a protocol stack at the UE; and transmitting the physical layer feedback in one or more higher layer communications with the base station using a higher layer in the protocol stack than the physical layer.

Aspect 2: The method of aspect 1, wherein the one or more higher layer communications include a medium access control (MAC) layer communications, and wherein the transmitting the physical layer feedback comprises: transmitting a MAC control element (MAC-CE) that indicates feedback for one or more physical layer acknowledgment feedback processes Aspect 3: The method of aspect 2, wherein the MAC-CE is identified by a reserved logical channel identification (LCID) or an extended LCID that is associated with acknowledgment feedback for the UE.

Aspect 4: The method of any of aspects 1 through 3, further comprising: receiving, from the base station prior to the receiving the one or more downlink transmissions, configuration information that disables the physical layer feedback reports and that enables the higher layer communications for transmission of the physical layer feedback.

Aspect 5: The method of any of aspects 1 through 4, further comprising: determining to transmit the physical layer feedback in the one or more higher layer communications based at least in part on an indication associated with communications between the UE and the base station.

Aspect 6: The method of aspect 5, wherein the indication associated with communications between the UE and the base station includes one or more of a physical layer indication of an unsuccessful receipt of the one or more downlink transmissions, a number of feedback processes with a negative acknowledgment exceeds a threshold value, a number of number of transmissions for the same feedback process exceeds a threshold value, a physical layer indication of a synchronization error, an expiration of a timer associated with physical layer synchronization, a timing for a periodic indication of feedback, a request from the base station to transmit the physical layer feedback, or any combinations thereof.

Aspect 7: The method of any of aspects 1 through 6, wherein the higher layer communications include one or more fixed size data or information transmissions for reporting a predetermined number of physical layer acknowledgment feedback processes to the base station.

Aspect 8: The method of any of aspects 1 through 7, wherein the higher layer communications include a channel quality report associated with a number of feedback processes having a negative acknowledgment feedback status.

Aspect 9: The method of any of aspects 1 through 8, wherein the higher layer communications include one or more variable sized data or information transmissions that each provide an identification of one or more feedback processes.

Aspect 10: The method of aspect 9, wherein the higher layer communications further include one or more of a feedback process identification and a number of times that data associated with the feedback process identification was attempted to be decoded at the UE.

Aspect 11: The method of any of aspects 1 through 10, further comprising: transmitting one or more uplink communications to the base station; receiving, from the base station via higher layer signaling, one or more physical layer feedback reports associated with the one or more uplink communications; and retransmitting one or more uplink communications based at least in part on the one or more physical layer feedback reports.

Aspect 12: The method of aspect 11, wherein a first medium access control (MAC) control element (CE) format is configured at the UE for transmission of the physical layer feedback for the one or more downlink transmissions, and a second MAC-CE is configured at the UE for reception of the one or more physical layer feedback reports associated with the one or more uplink communications.

Aspect 13: The method of any of aspects 1 through 12, further comprising: transmitting, to the base station, a capability message that indicates the UE is capable to communicate physical layer feedback in one or more higher layer communications with the base station.

Aspect 14: The method of any of aspects 1 through 13, further comprising: receiving, from the base station, signaling that indicates higher layer communications are to be used for physical layer feedback.

Aspect 15: The method of aspect 14, wherein the signaling that indicates higher layer communications are to be used for physical layer feedback is received in broadcast information from the base station, in RRC signaling from the base station, or combinations thereof.

Aspect 16: The method of any of aspects 1 through 15, further comprising: receiving, subsequent to the transmitting the physical layer feedback in the one or more higher layer communications, a resource grant for retransmission of the physical layer feedback; and retransmitting the physical layer feedback in the one or more higher layer communications based at least in part on the resource grant.

Aspect 17: A method for wireless communication at a UE, comprising: receiving one or more downlink transmissions from a base station via a wireless connection with the base station; determining physical layer feedback for the one or more downlink transmissions, wherein the physical layer feedback is determined at a physical layer of a protocol stack of the UE that is a lower layer than one or more higher layers of the protocol stack; identifying that one or more conditions associated with the wireless connection indicate that the physical layer feedback is to be provided to the base station; and transmitting, responsive to the identifying, the physical layer feedback to the base station.

Aspect 18: The method of aspect 17, further comprising: disabling, prior to the receiving the one or more downlink transmissions, physical layer reports of feedback for the wireless connection between the UE and the base station; and transmitting the physical layer feedback in a higher layer communication with the base station.

Aspect 19: The method of aspect 18, wherein the higher layer communication is a medium access control (MAC) layer communication that includes a MAC control element (MAC-CE) that includes the physical layer feedback.

Aspect 20: The method of any of aspects 17 through 19, wherein the identifying comprises: receiving an indication from the physical layer that one or more of the downlink transmissions were unsuccessfully decoded.

Aspect 21: The method of aspect 20, wherein the indication from the physical layer indicates that decoding failed for one or more feedback process identifications, or that a number of unsuccessful decoding attempts of one or more of the downlink transmissions exceeds a threshold value.

Aspect 22: The method of aspect 21, wherein the threshold value is configured by RRC signaling received from the base station.

Aspect 23: The method of any of aspects 17 through 22, wherein the identifying comprises: determining that a number of feedback processes for which decoding of an associated downlink transmission is unsuccessful exceeds a threshold number.

Aspect 24: The method of any of aspects 17 through 23, wherein the identifying further comprises: receiving a synchronization error indication from the physical layer.

Aspect 25: The method of any of aspects 17 through 24, wherein the identifying further comprises: determining that a timer associated with physical layer synchronization has expired.

Aspect 26: The method of any of aspects 17 through 25, wherein the identifying further comprises: determining that a periodic physical layer feedback report is to be transmitted to the base station.

Aspect 27: The method of aspect 26, wherein a periodic reporting interval is configured by the base station having a periodicity that is based at least in part on a propagation delay between the UE and the base station.

Aspect 28: The method of any of aspects 17 through 27, wherein the identifying further comprises: receiving a request from the base station to transmit the physical layer feedback.

Aspect 29: The method of any of aspects 17 through 28, further comprising: transmitting one or more uplink communications to the base station; receiving, from the base station via higher layer signaling, one or more physical layer feedback reports associated with the one or more uplink communications; and retransmitting one or more uplink communications based at least in part on the one or more physical layer feedback reports.

Aspect 30: The method of aspect 29, wherein a first medium access control (MAC) control element (CE) format is configured at the UE for transmission of the physical layer feedback for the one or more downlink transmissions, and a second MAC-CE is configured at the UE for reception of the one or more physical layer feedback reports associated with the one or more uplink communications.

Aspect 31: A method for wireless communication at a base station, comprising: transmitting one or more downlink communications to a UE via a wireless connection with the UE; receiving a physical layer feedback report in a higher layer communication from the UE, wherein the physical layer feedback is associated with a physical layer of a protocol stack at the UE that is a lower layer than one or more higher layers of the protocol stack; and retransmitting one or more of the downlink communication to the UE based at least in part on the physical layer feedback report.

Aspect 32: The method of aspect 31, wherein the higher layer communication from the UE is a medium access control (MAC) layer communication that includes a MAC control element (MAC-CE) that indicates feedback for one or more physical layer acknowledgment feedback processes of the UE.

Aspect 33: The method of aspect 32, wherein the MAC-CE includes a reserved logical channel identification (LCID) or an extended LCID that is associated with acknowledgment feedback for the UE.

Aspect 34: The method of any of aspects 31 through 33, further comprising: transmitting, to the UE, configuration information that disables physical layer reports of feedback and that enables the higher layer communications for transmission of the physical layer feedback report.

Aspect 35: The method of any of aspects 31 through 34, wherein configuring the UE to transmit the physical layer feedback report in the higher layer communication based at least in part on one or more of: a physical layer indication at the UE of an unsuccessful receipt of the one or more downlink transmissions, a number of feedback processes at the UE with a negative acknowledgment exceeds a threshold value, a physical layer indication of a synchronization error at the UE, an expiration at the UE of a timer associated with physical layer synchronization, a timing for a periodic indication of feedback, a request from the base station to transmit the physical layer feedback report, or any combinations thereof.

Aspect 36: The method of any of aspects 31 through 35, wherein the higher layer communication includes one or more fixed size data or information transmissions for reporting a predetermined number of physical layer feedback processes of the UE.

Aspect 37: The method of any of aspects 31 through 36, wherein the higher layer communication includes a channel quality report associated with a number of feedback processes having a negative acknowledgment feedback status.

Aspect 38: The method of any of aspects 31 through 37, wherein the higher layer communication includes one or more variable sized data or information transmissions that each provide an identification of one or more feedback processes at the UE.

Aspect 39: The method of aspect 38, wherein the higher layer communication further includes one or more of a feedback process identification and a number of times that data associated with the feedback process identification was attempted to be decoded at the UE.

Aspect 40: The method of any of aspects 31 through 39, further comprising: receiving one or more uplink communications from the UE; determining physical layer feedback associated with the one or more uplink communications; and transmitting, to the UE via higher layer signaling, one or more physical layer feedback reports associated with the one or more uplink communications.

Aspect 41: The method of aspect 40, wherein a first medium access control (MAC) control element (CE) format is configured at the UE for transmission of the physical layer feedback report for the one or more downlink transmissions, and a second MAC-CE is configured at the UE for reception of the one or more physical layer feedback reports associated with the one or more uplink communications.

Aspect 42: The method of any of aspects 31 through 41, further comprising: receiving, from the UE, a capability message that indicates the UE is capable to communicate physical layer feedback in one or more higher layer communications with the base station.

Aspect 43: The method of any of aspects 31 through 42, further comprising: transmitting, to the UE, signaling that indicates the higher layer communication is to be used for physical layer feedback.

Aspect 44: The method of aspect 43, wherein the signaling that indicates the higher layer communication is to be used for physical layer feedback is transmitted in broadcast information from the base station, in RRC signaling from the base station, or combinations thereof.

Aspect 45: The method of any of aspects 31 through 44, further comprising: transmitting, responsive to a failure to decode the physical layer acknowledgment feedback report in the higher layer communication, a resource grant for retransmission of the physical layer feedback; and monitoring for a retransmission of the physical layer feedback report in the one or more higher layer communications based at least in part on the resource grant.

Aspect 46: A method for wireless communication at a base station, comprising: transmitting one or more downlink transmissions to a UE via a wireless connection with the UE; identifying that one or more conditions associated with the wireless connection indicate that physical layer feedback is to be provided to the base station; and receiving, responsive to the identifying, the physical layer feedback from the UE, wherein the physical layer feedback is generated by a physical layer of a protocol stack of the UE that is a lower layer than one or more higher layers of the protocol stack of the UE.

Aspect 47: The method of aspect 46, further comprising: disabling physical layer reports of the physical layer feedback prior to the transmitting the one or more downlink transmissions to the UE; and receiving the physical layer feedback in a higher layer communication from the UE.

Aspect 48: The method of aspect 47, wherein the higher layer communication is a medium access control (MAC) layer communication that includes a MAC control element (MAC-CE) that includes the physical layer feedback.

Aspect 49: The method of any of aspects 46 through 48, further comprising: configuring the UE to transmit the physical layer feedback based at least in part on one or more conditions at the UE.

Aspect 50: The method of aspect 49, wherein the one or more conditions at the UE include one of more of a physical layer indication that one or more of the downlink transmissions were unsuccessfully decoded, or a physical layer indication that decoding failed for one or more feedback process identifications, or that a number of unsuccessful decoding attempts of one or more of the downlink transmissions exceeds a threshold value.

Aspect 51: The method of any of aspects 49 through 50, wherein the one or more conditions at the UE further includes a number of feedback processes for which decoding of an associated downlink transmission is unsuccessful exceeds a threshold number.

Aspect 52: The method of any of aspects 49 through 51, wherein the one or more conditions at the UE further include a synchronization error at the physical layer of the UE.

Aspect 53: The method of any of aspects 49 through 52, wherein the one or more conditions at the UE further include an expiration of a timer associated with physical layer synchronization.

Aspect 54: The method of any of aspects 49 through 53, wherein the one or more conditions at the UE further include a timing associated with a periodic physical layer feedback report.

Aspect 55: The method of aspect 54, further comprising: configuring the UE with the timing for periodic physical layer feedback reports based at least in part on a propagation delay between the UE and the base station.

Aspect 56: The method of any of aspects 46 through 55, further comprising: transmitting a request to the UE to transmit the physical layer feedback, and wherein the receiving is performed responsive to the request.

Aspect 57: The method of any of aspects 46 through 56, further comprising: receiving one or more uplink communications from the UE; determining physical layer feedback associated with the one or more uplink communications; and transmitting, to the UE via higher layer signaling, one or more physical layer feedback reports associated with the one or more uplink communications.

Aspect 58: The method of aspect 57, wherein a first medium access control (MAC) control element (CE) format is configured at the UE for transmission of the physical layer feedback for the one or more downlink transmissions, and a second MAC-CE is configured at the UE for reception of the one or more physical layer feedback reports associated with the one or more uplink communications.

Aspect 59: An apparatus for wireless communication at a UE, comprising a processor; memory coupled with the processor; and instructions stored in the memory and executable by the processor to cause the apparatus to perform a method of any of aspects 1 through 16.

Aspect 60: An apparatus for wireless communication at a UE, comprising at least one means for performing a method of any of aspects 1 through 16.

Aspect 61: A non-transitory computer-readable medium storing code for wireless communication at a UE, the code comprising instructions executable by a processor to perform a method of any of aspects 1 through 16.

Aspect 62: An apparatus for wireless communication at a UE, comprising a processor; memory coupled with the processor; and instructions stored in the memory and executable by the processor to cause the apparatus to perform a method of any of aspects 17 through 30.

Aspect 63: An apparatus for wireless communication at a UE, comprising at least one means for performing a method of any of aspects 17 through 30.

Aspect 64: A non-transitory computer-readable medium storing code for wireless communication at a UE, the code comprising instructions executable by a processor to perform a method of any of aspects 17 through 30.

Aspect 65: An apparatus for wireless communication at a base station, comprising a processor; memory coupled with the processor; and instructions stored in the memory and executable by the processor to cause the apparatus to perform a method of any of aspects 31 through 45.

Aspect 66: An apparatus for wireless communication at a base station, comprising at least one means for performing a method of any of aspects 31 through 45.

Aspect 67: A non-transitory computer-readable medium storing code for wireless communication at a base station, the code comprising instructions executable by a processor to perform a method of any of aspects 31 through 45.

Aspect 68: An apparatus for wireless communication at a base station, comprising a processor; memory coupled with the processor; and instructions stored in the memory and executable by the processor to cause the apparatus to perform a method of any of aspects 46 through 58.

Aspect 69: An apparatus for wireless communication at a base station, comprising at least one means for performing a method of any of aspects 46 through 58.

Aspect 70: A non-transitory computer-readable medium storing code for wireless communication at a base station, the code comprising instructions executable by a processor to perform a method of any of aspects 46 through 58.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving one or more downlink transmissions from an access network entity via a wireless connection with the access network entity;
determining physical layer feedback for the one or more downlink transmissions, the physical layer feedback associated with a physical layer of a protocol stack at the UE; and
transmitting the physical layer feedback in one or more higher layer communications with the access network entity using a higher layer in the protocol stack than the physical layer.

2. The method of claim 1, wherein the one or more higher layer communications include a medium access control (MAC) layer communication, and wherein the transmitting the physical layer feedback comprises:
transmitting a MAC control element (MAC-CE) that indicates feedback for one or more physical layer acknowledgment feedback processes.

3. The method of claim 2, wherein the MAC-CE is identified by a reserved logical channel identification (LCID) or an extended LCID that is associated with acknowledgment feedback for the UE.

4. The method of claim 1, further comprising:
receiving, prior to the receiving the one or more downlink transmissions, configuration information that disables the physical layer feedback reports and that enables the higher layer communications for transmission of the physical layer feedback.

5. The method of claim 1, further comprising:
determining to transmit the physical layer feedback in the one or more higher layer communications based at least in part on an indication associated with communications between the UE and the access network entity.

6. The method of claim 5, wherein the indication associated with communications between the UE and the access network entity includes one or more of:
a physical layer indication of an unsuccessful receipt of the one or more downlink transmissions,
a number of feedback processes with a negative acknowledgment exceeds a threshold value,
a number of transmissions for the same feedback process exceeds a threshold value,
a physical layer indication of a synchronization error,
an expiration of a timer associated with physical layer synchronization,
a timing for a periodic indication of feedback,
a request from the access network entity to transmit the physical layer feedback,
or any combinations thereof.

7. The method of claim 1, wherein the higher layer communications include one or more of:
one or more fixed size data or information transmissions for reporting a predetermined number of physical layer acknowledgment feedback processes to the access network entity,
a channel quality report associated with a number of feedback processes having a negative acknowledgment feedback status,
one or more variable sized data or information transmissions that each provide an identification of one or more feedback processes,
a feedback process identification and a number of times that data associated with the feedback process identification was attempted to be decoded at the UE,
or any combinations thereof.

8. The method of claim 1, further comprising:
transmitting one or more uplink communications to the access network entity;
receiving, via higher layer signaling, one or more physical layer feedback reports associated with the one or more uplink communications; and
retransmitting one or more uplink communications based at least in part on the one or more physical layer feedback reports.

9. The method of claim 8, wherein a first medium access control (MAC) control element (CE) format is configured at the UE for transmission of the physical layer feedback for the one or more downlink transmissions, and a second MAC-CE is configured at the UE for reception of the one or more physical layer feedback reports associated with the one or more uplink communications.

10. The method of claim 1, further comprising:
transmitting a capability message that indicates the UE is capable to communicate physical layer feedback in one or more higher layer communications; and
receiving signaling that indicates higher layer communications are to be used for physical layer feedback, wherein the signaling that indicates higher layer communications are to be used for physical layer feedback is received in broadcast information from the access network entity, in radio resource control (RRC) signaling from the access network entity, or combinations thereof.

11. The method of claim 1, further comprising:
identifying that one or more conditions associated with the wireless connection indicate that the physical layer feedback is to be provided to the access network entity, wherein the physical layer feedback is transmitted responsive to the identifying.

12. The method of claim 11, further comprising:
disabling, prior to the receiving the one or more downlink transmissions, physical layer reports of feedback for the wireless connection between the UE and the access network entity.

13. The method of claim 11, wherein the identifying comprises:
receiving an indication from the physical layer that one or more of the downlink transmissions were unsuccessfully decoded, that indicates that decoding failed for one or more feedback process identifications, or that a number of unsuccessful decoding attempts of one or more of the downlink transmissions exceeds a threshold value.

14. The method of claim 11, wherein the identifying comprises one or more of:
determining that a number of feedback processes for which decoding of an associated downlink transmission is unsuccessful exceeds a threshold number, receiving a synchronization error indication from the physical layer, determining that a timer associated with physical layer synchronization has expired, determining that a periodic physical layer feedback report is to be transmitted to the access network entity, wherein a periodic reporting interval is configured by the access network entity having a periodicity that is based at least in part on a propagation delay between the UE and the access network entity base, receiving a request from the access network entity to transmit the physical layer feedback, or any combinations thereof.

15. A method for wireless communication at an access network entity, comprising:

transmitting one or more downlink communications to a user equipment (UE) via a wireless connection with the UE;

receiving a physical layer feedback report in a higher layer communication from the UE, wherein the physical layer feedback is associated with a physical layer of a protocol stack at the UE that is a lower layer than one or more higher layers of the protocol stack; and retransmitting one or more of the downlink communications to the UE based at least in part on the physical layer feedback report.

16. The method of claim 15, wherein the higher layer communication from the UE is a medium access control (MAC) layer communication that includes a MAC control element (MAC-CE) that indicates feedback for one or more physical layer acknowledgment feedback processes of the UE.

17. The method of claim 15, further comprising:

configuring the UE to transmit the physical layer feedback report in the higher layer communication based at least in part on one or more of:

a physical layer indication at the UE of an unsuccessful receipt of the one or more downlink transmissions, a number of feedback processes at the UE with a negative acknowledgment exceeds a threshold value, a physical layer indication of a synchronization error at the UE, an expiration at the UE of a timer associated with physical layer synchronization, a timing for a periodic indication of feedback, a request to transmit the physical layer feedback report, or any combinations thereof.

18. The method of claim 15, further comprising:

identifying that one or more conditions associated with the wireless connection indicate that physical layer feedback is to be provided to the access network entity, wherein the physical layer feedback is received responsive to the identifying.

19. The method of claim 18, further comprising:

disabling physical layer reports of the physical layer feedback prior to the transmitting the one or more downlink transmissions to the UE; and receiving the physical layer feedback in a higher layer communication from the UE.

20. The method of claim 18, further comprising:

configuring the UE to transmit the physical layer feedback based at least in part on one or more conditions at the UE.

21. The method of claim 20, wherein the one or more conditions at the UE include one of more of:

a physical layer indication that one or more of the downlink transmissions were unsuccessfully decoded, a physical layer indication that decoding failed for one or more feedback process identifications, a number of unsuccessful decoding attempts of one or more of the downlink transmissions exceeds a threshold value, a number of feedback processes for which decoding of an associated downlink transmission is unsuccessful exceeds a threshold number, a synchronization error at the physical layer of the UE, an expiration of a timer associated with physical layer synchronization, a timing associated with a periodic physical layer feedback report that is based at least in part on a propagation delay between the UE and the access network entity, or any combinations thereof.

22. An apparatus for wireless communication at a user equipment (UE), comprising:

a processor, memory coupled with the processor; and instructions stored in the memory and executable by the processor to cause the apparatus to:

receive one or more downlink transmissions from an access network entity via a wireless connection with the access network entity;

determine physical layer feedback for the one or more downlink transmissions; and transmit the physical layer feedback in one or more higher layer communications with the access network entity, wherein the physical layer feedback is determined at a physical layer of a protocol stack at the UE that is a lower layer than one or more higher layers used to transmit the higher layer communications.

23. The apparatus of claim 22, wherein:

the one or more higher layer communications include a medium access control (MAC) layer communication, and wherein the physical layer feedback is transmitted in a MAC control element (MAC-CE) that indicates feedback for one or more physical layer acknowledgment feedback processes.

24. The apparatus of claim 22, wherein the instructions are further executable by the processor to cause the apparatus to:

receive, prior to the one or more downlink transmissions, configuration information that disables the physical layer feedback reports and that enables the higher layer communications for transmission of the physical layer feedback.

25. The apparatus of claim 22, wherein the instructions are further executable by the processor to cause the apparatus to:

identify that one or more conditions associated with the wireless connection indicate that the physical layer feedback is to be provided to the access network entity, wherein the physical layer feedback is transmitted responsive to the identifying.

26. The apparatus of claim 25, wherein the instructions are further executable by the processor to cause the apparatus to:

disable, prior to the one or more downlink transmissions, physical layer reports of feedback for the wireless connection between the UE and the access network entity.

27. An apparatus for wireless communication at an access network entity, comprising:

a processor, memory coupled with the processor; and instructions stored in the memory and executable by the processor to cause the apparatus to:

transmit one or more downlink communications to a user equipment (UE) via a wireless connection with the UE;

receive a physical layer feedback report in a higher layer communication from the UE, wherein the physical layer feedback is associated with a physical layer of a protocol stack at the UE that is a lower layer than one or more higher layers of the protocol stack; and retransmit one or more of the downlink communications to the UE based at least in part on the physical layer feedback report.

28. The apparatus of claim 27, wherein the higher layer communication from the UE is a medium access control (MAC) layer communication that includes a MAC control element (MAC-CE) that indicates feedback for one or more physical layer acknowledgment feedback processes of the UE.

29. The apparatus of claim 27, wherein the instructions are further executable by the processor to cause the apparatus to:

identify that one or more conditions associated with the wireless connection indicate that physical layer feedback is to be provided to the access network entity, wherein the physical layer feedback is received responsive thereto.

30. The apparatus of claim 29, wherein the instructions are further executable by the processor to cause the apparatus to:

disable physical layer reports of the physical layer feedback prior to the one or more downlink transmissions to the UE.

\* \* \* \* \*